Aug. 15, 1967    D. SHICHMAN ETAL    3,336,025

PART FEEDING MECHANISM

Filed April 29, 1965    12 Sheets-Sheet 1

INVENTORS
DANIEL SHICHMAN
HENRY C. FARRAR
WALTER N. KOE
BY
Norbert P. Holler
ATTORNEY INVENTORS
DANIEL SHICHMAN
HENRY C. FARRAR
WALTER N. KOE
BY
Norbert P. Holler
ATTORNEY INVENTORS
DANIEL SHICHMAN
HENRY C. FARRAR
WALTER N. KOE
BY
Norbert P. Holler
ATTORNEY INVENTORS
DANIEL SHICHMAN
HENRY C. FARRAR
WALTER N. KOE
BY Norbert P. Holler
ATTORNEY INVENTORS
DANIEL SHICHMAN
HENRY C. FARRAR
WALTER N. KOE
BY Norbert P. Holler
ATTORNEY INVENTORS
DANIEL SHICHMAN
HENRY C. FARRAR
BY WALTER N. KOE
Norbert P. Holler
ATTORNEY INVENTORS
DANIEL SHICHMAN
HENRY C. FARRAR
WALTER N. KOE
BY Norbert P. Holler
ATTORNEY Aug. 15, 1967 D. SHICHMAN ETAL 3,336,025

PART FEEDING MECHANISM

Filed April 29, 1965 12 Sheets-Sheet 8

INVENTORS
DANIEL SHICHMAN
HENRY C. FARRAR
WALTER N. KOE

BY Norbert P. Holler
ATTORNEY

INVENTORS
DANIEL SHICHMAN
HENRY C. FARRAR
WALTER N. KOE
BY
Norbert P. Holler
ATTORNEY

INVENTORS
DANIEL SHICHMAN
HENRY C. FARRAR
WALTER N. KOE

BY Norbert P. Holler

ATTORNEY

PART FEEDING MECHANISM

Filed April 29, 1965 12 Sheets-Sheet 11

INVENTORS
DANIEL SHICHMAN
HENRY C. FARRAR
WALTER N. KOE
BY
Norbert P. Holler
ATTORNEY INVENTORS
DANIEL SHICHMAN
HENRY C. FARRAR
WALTER N. KOE
BY Norbert P. Holler
ATTORNEY 3,336,025

PART FEEDING MECHANISM

Daniel Shichman, Cedar Grove, and Henry C. Farrar, Wayne, N.J., and Walter N. Koe, Bedford, Mass., assignors to Uniroyal, Inc., a corporation of New Jersey Filed Apr. 29, 1965, Ser. No. 451,928
31 Claims. (Cl. 271—1)

This invention relates to the art of feeding work parts from a supply location thereof to a working station, and in particular relates to the feeding of sheet material parts from a stack of such parts.

Although, as will appear from the following description, the present invention is of general utility, being adaptable to the feeding of many diverse types of work parts singly or in predetermined numbers from a stack thereof to a working station, it will hereinafter be described with particular reference to the feeding of pairs of shoe upper sections or quarters to be seamed and stayed, from a stack of unseamed quarters or sections to a sewing machine.

In the manufacture of both leather and non-leather footwear, and especially of canvas or fabric-topped shoes, it is necessary to feed the appropriately cut and contoured shoe upper sections in pairs, with their faces (which will be the outside of the shoe) engaging each other, to a seaming and staying station which includes generally a first sewing machine adapted to seam the two sections to each other along the heel-forming edge thereof and a second sewing machine at which the previously seamed shoe upper sections are opened at both sides of the seaming stitches and the staying tape applied and sewed to the folded-over heel-end edge regions of the said sections. Such seaming and staying operations per se constitute no part of the present invention and thus will not be more explicitly referred to herein except as necessary to provide a frame of reference for the invention.

As will be readily apparent, for such operations to be properly carried out, it is essential that the paired shoe upper sections arrive at the first sewing machine in precisely superposed relation to one another, i.e., with their respective edges coinciding exactly. Heretofore it has been customary either manually or by means of suitable suction-type or other transfer mechanisms to take two shoe upper sections to be seamed from separate stacks, and assemble them in the desired superimposed relation with each other, preparatory to the feeding of the assembled pair of shoe upper sections to the seaming machine. Such procedures, however, are somewhat disadvantageous in that it is difficult thereby to achieve the proper alignment of the sections, and in that present day high speed manufacturing requirements cannot tolerate procedures which are relatively slow and also are susceptible to frequent interruptions and shut-down periods and production of "rejects" or defective shoe uppers at the seaming machine by virtue of such mis-alignment.

It is an important object of the present invention, therefore, to provide a novel and highly efficient system for feeding pre-paired shoe upper sections from a single stack thereof to a seaming machine, which system is free of the disadvantages inherent in the known feed systems heretofore employed.

Another object of the present invention is the provision, for such a system, of a novel technique of and means for extracting the paired shoe upper sections from the stack.

Another object of the present invention is the provision, for such a system, of novel means for transferring the separated pairs of shoe upper sections to a conveyor arrangement and for then transferring the conveyed shoe upper sections to the seaming machine in a manner rendering a misalignment of the sections effectively impossible.

Still another object of the present invention is to provide a system of this type equipped with means for detecting any error that may have occurred in the separation of the shoe upper sections from the stack prior to the transfer of such parts to the seaming machine.

Yet another object of the present invention is the provision of a system as aforesaid which is readily adapted to and adjustable for feeding paired shoe upper sections of various sizes, shapes and thicknesses.

Viewed more broadly, of course, it is also an object of the present invention to provide a novel system for feeding diverse types of sheet material parts in preselected numbers from a supply stack to a delivery location at which means are effective to sense whether the fed part or parts are correct in number and/or thickness prior to removal of the arrived part or parts to a subsequent receiving station.

The foregoing and other objects and characteristics of the present invention, as well as its attendant advantages, will be more fully understood from the following detailed description thereof when read in conjunction with the accompanying drawings, in which:

FIG. 1 is a fragmentary, partly schematic, side elevational view, in perspective, of a machine for feeding shoe upper sections or quarters from a stack thereof to a seaming mechanism or the like in accordance with the principles of the present invention;

FIGS. 2*a* and 2*b* constitute a continuous top plan view, divided along the line 2—2 at the righthand side of FIG. 2*a* and at the left-hand side of FIG. 2*b*, of the machine, certain parts being broken away or omitted where necessary to show interior details;

Figure 3:
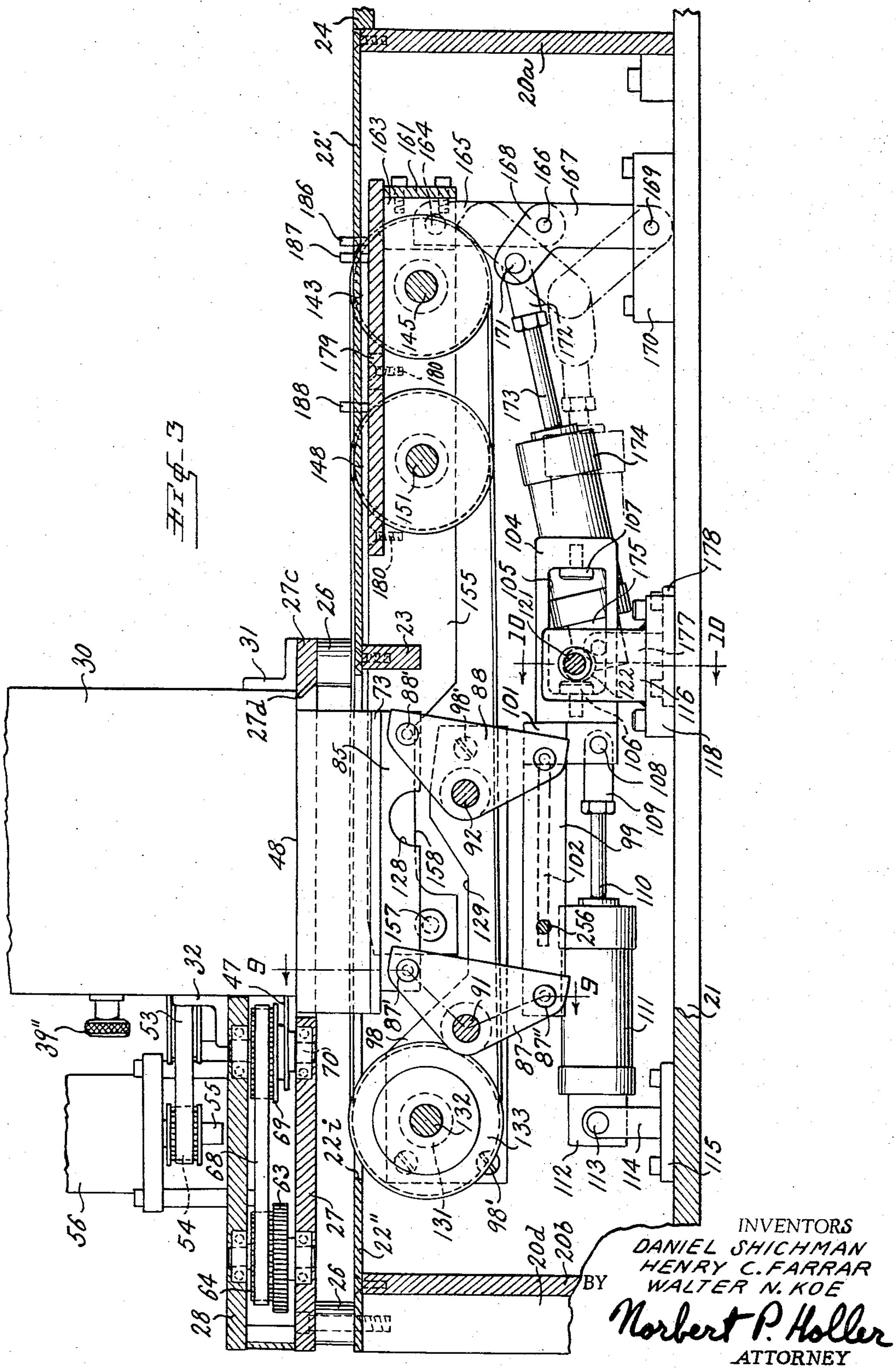
FIG. 3 is a fragmentary side elevational view, partly in section, of the structure shown in FIG. 2*a*.
Figure 4:
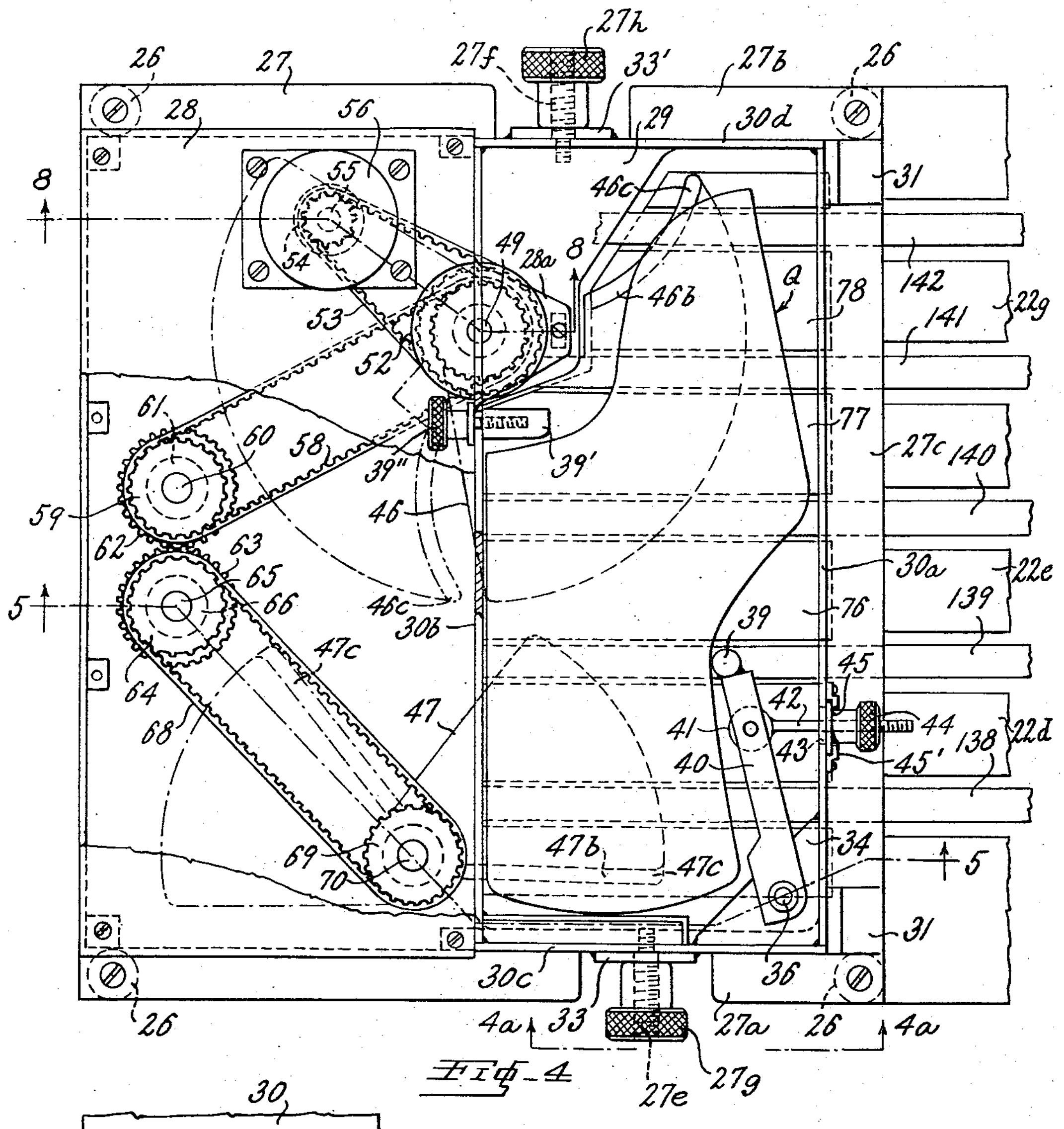
FIG. 4 is a fragmentary top plan view of the stack end of the machine shown in FIG. 3 and also illustrates the means for separating the shoe upper sections from the stack.
Figure 4A:
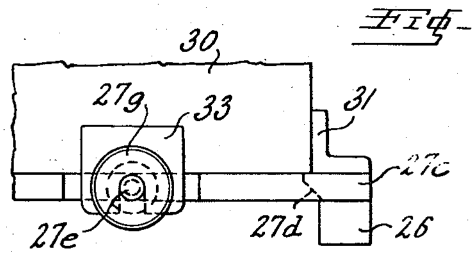
Figure 5:
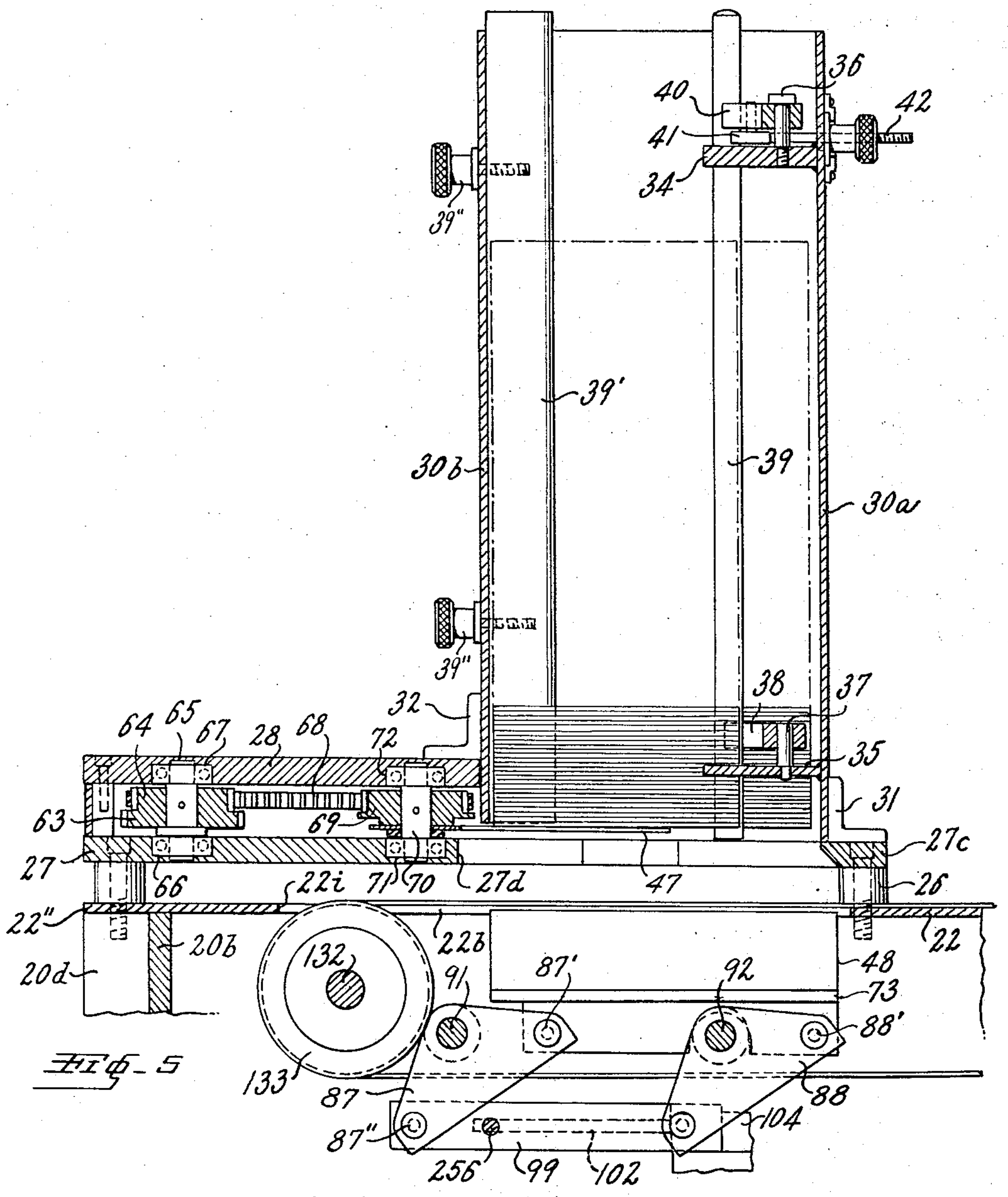
Figure 8:
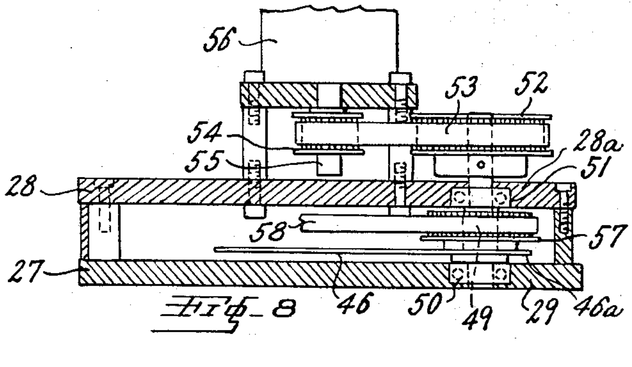
Figure 6:
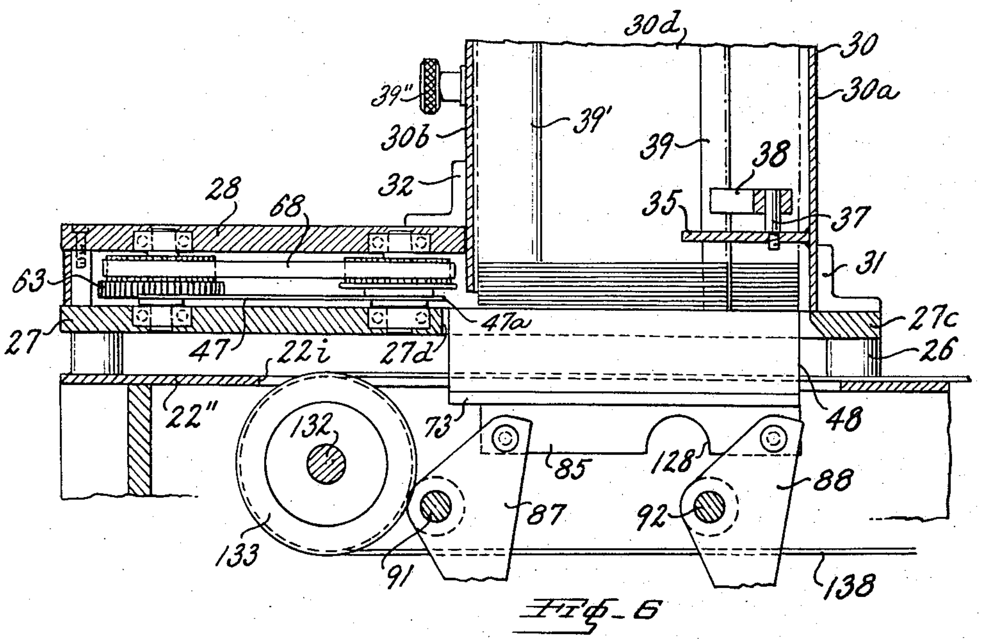
Figure 7:
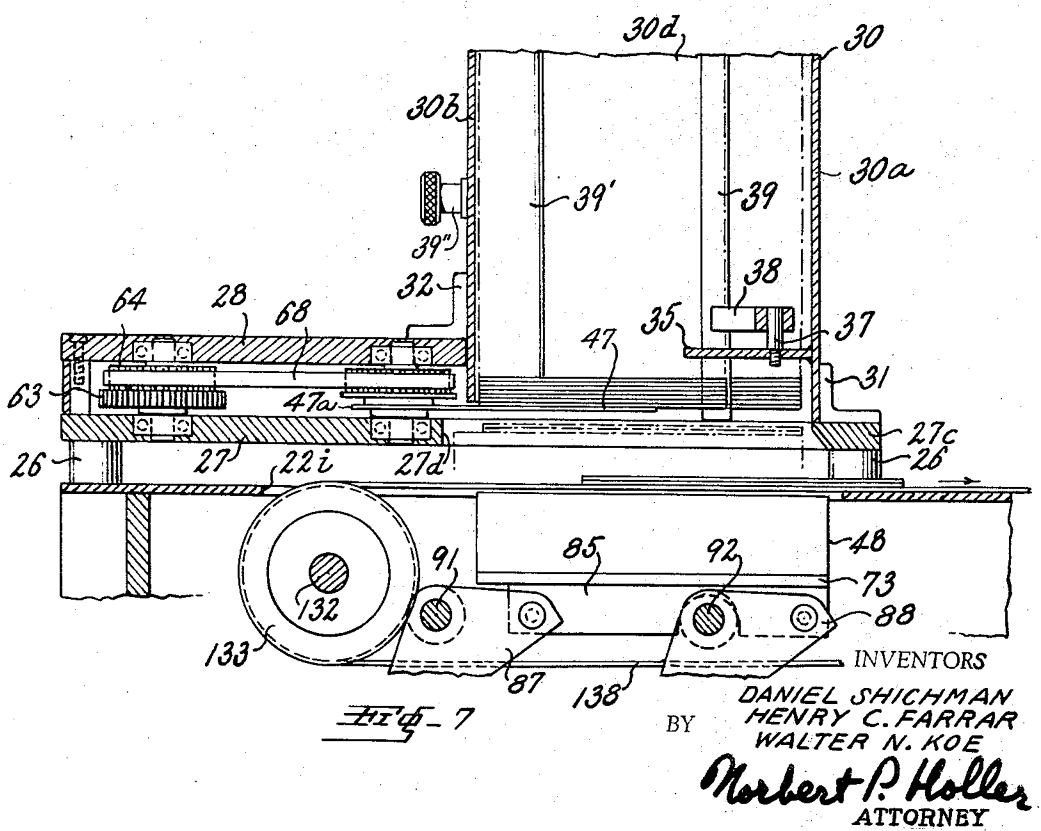
Figure 9:
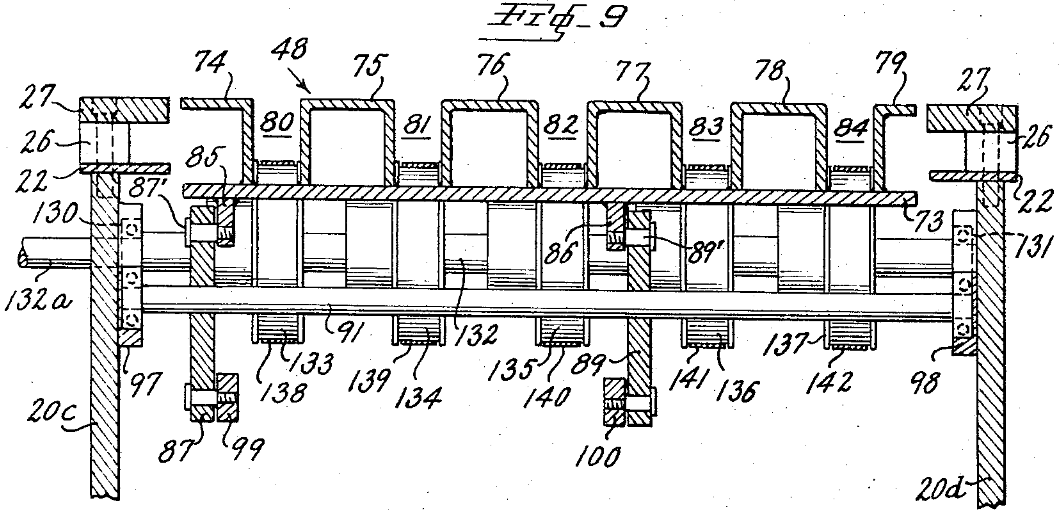
Figure 10:
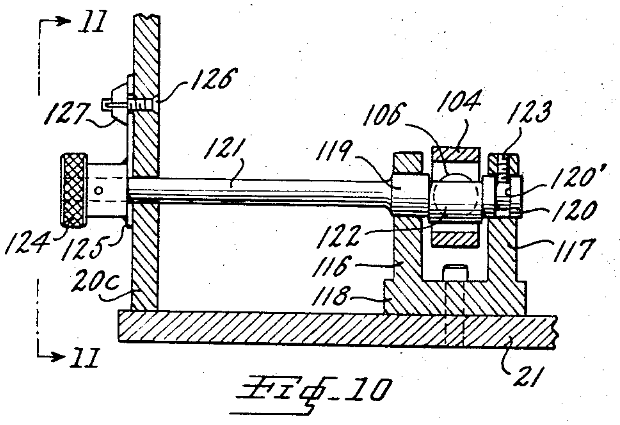
Figure 11:
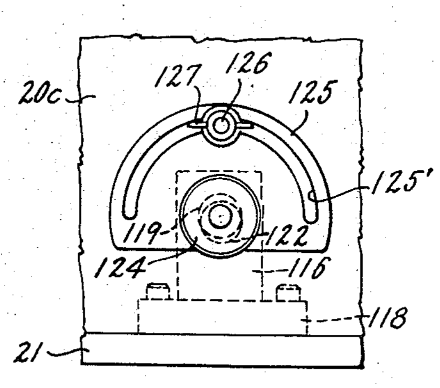
Figures 12, 13, 14, 15, 16:
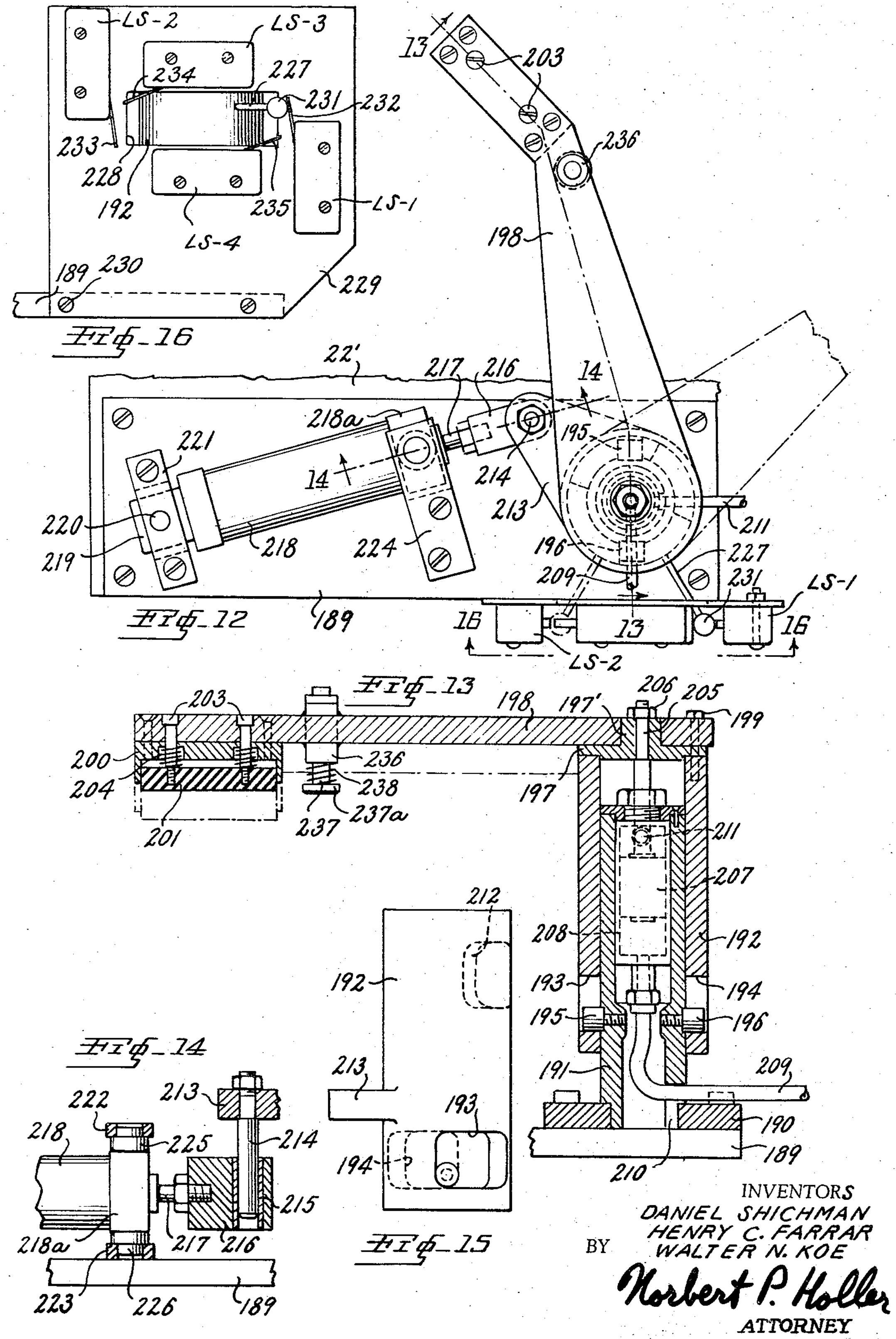
Figures 17, 18:
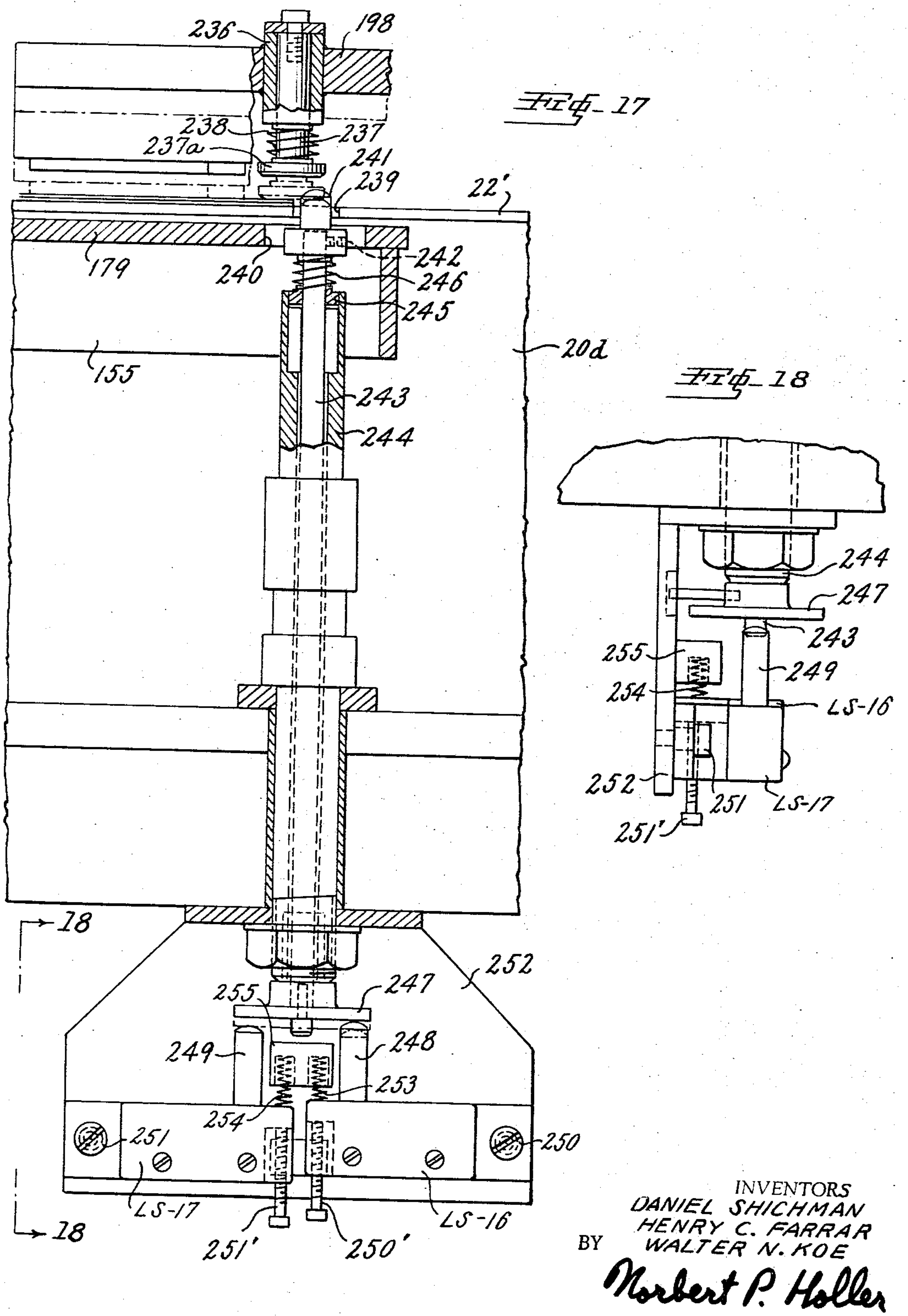
Figure 19A:
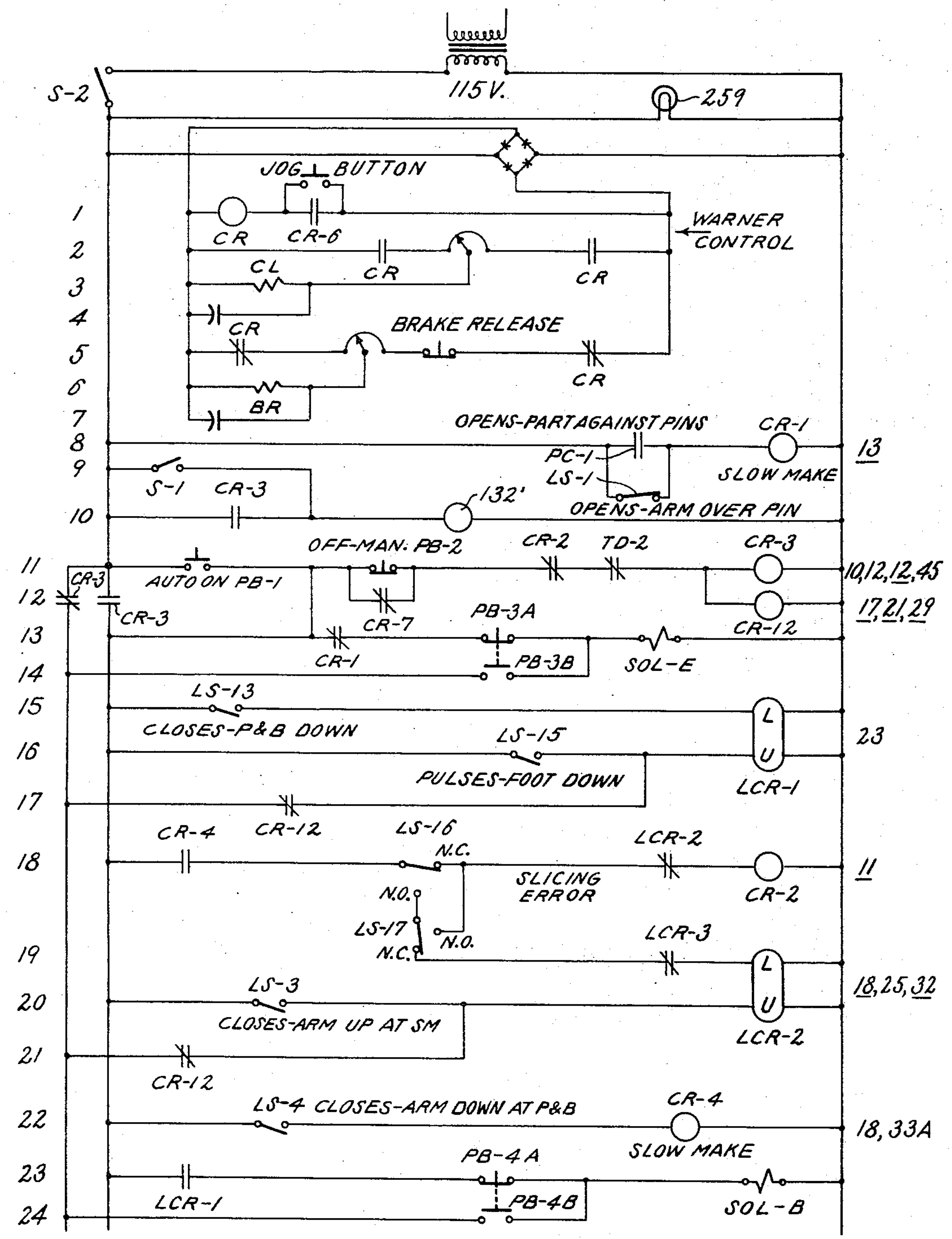
Figure 19B:
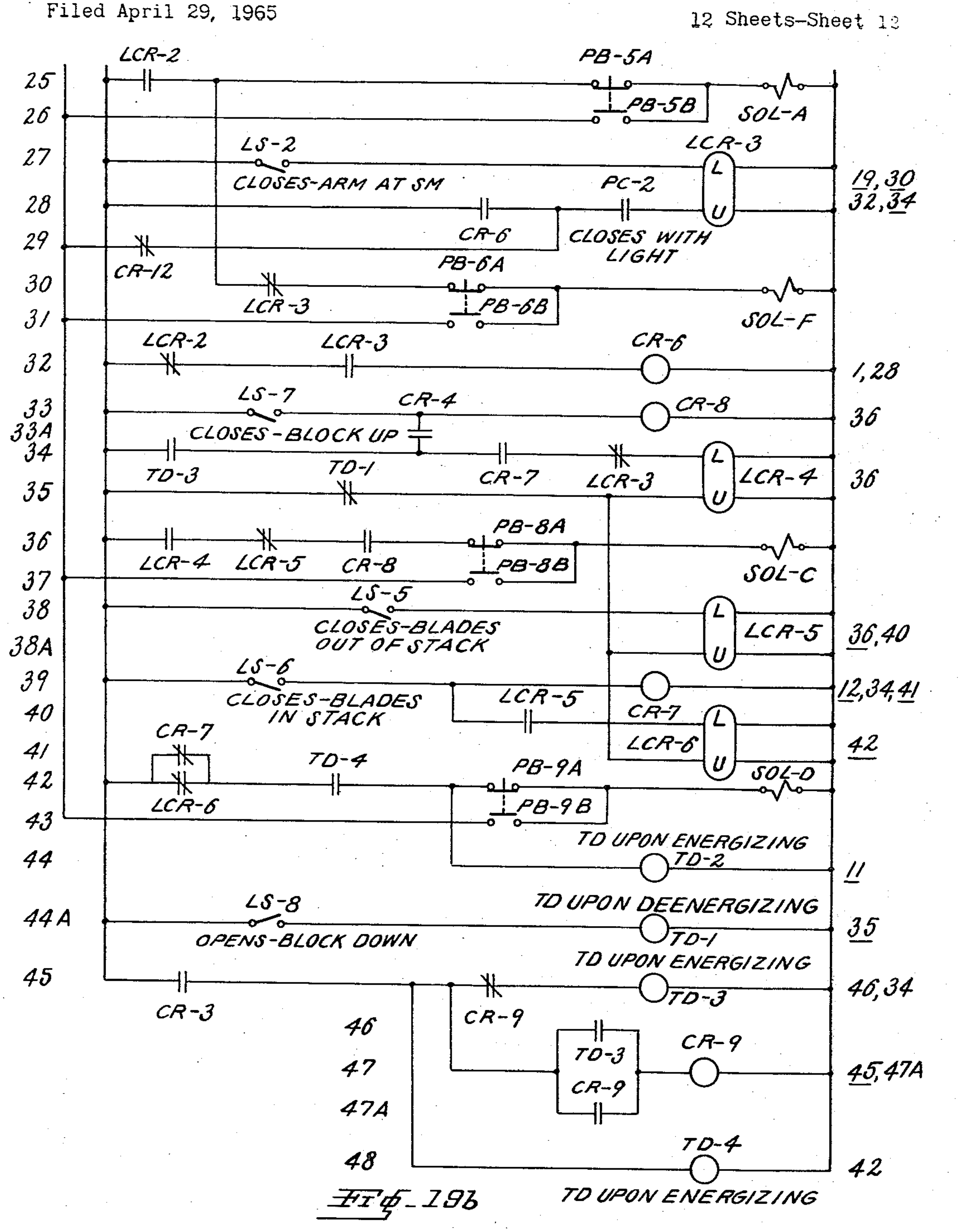

FIG. 4*a* is a fragmentary elevational view, taken along the line **4*a*—4*a*** in FIG. 4, of a detail of the machine;

FIG. 5 is a sectional view taken along the line 5—5 in FIG. 4 and illustrates the separating means in one stage of operation thereof;

FIGS. 6 and 7 are fragmentary sectional views similar to FIG. 5 and illustrate different stages in the operation of the separating means;

FIG. 8 is a fragmentary sectional view taken along the line 8—8 in FIG. 4;

FIGS. 9 and 10 are fragmentary sectional views, respectively, taken along the lines 9—9 and 10—10 in FIG. 3;

FIG. 11 is a fragmentary elevational view taken along the line 11—11 in FIG. 10;

FIG. 12 is a fragmentary top plan view of the part of the machine employed in transferring each separated and conveyed pair of shoe upper sections to the seaming mechanism;

FIGS. 13 and 14 are fragmentary sectional views taken along the lines 13—13 and 14—14 in FIG. 12;

FIG. 15 is an elevational view of a detail of the structure shown in FIGS. 12 and 13;

FIG. 16 is a fragmentary elevational view taken along the line 16—16 in FIG. 12;

FIG. 17 is a fragmentary elevational view, partly in section, of the means for sensing the number of the shoe upper sections reaching the transfer mechanism shown in FIGS. 12 to 15;

FIG. 18 is a fragmentary elevational view taken along the line 18—18 in FIG. 17; and FIGS. 19*a* and 19*b* together are a schematic wiring diagram of the control circuitry for the machine.

*General description of machine*

Figure 1:
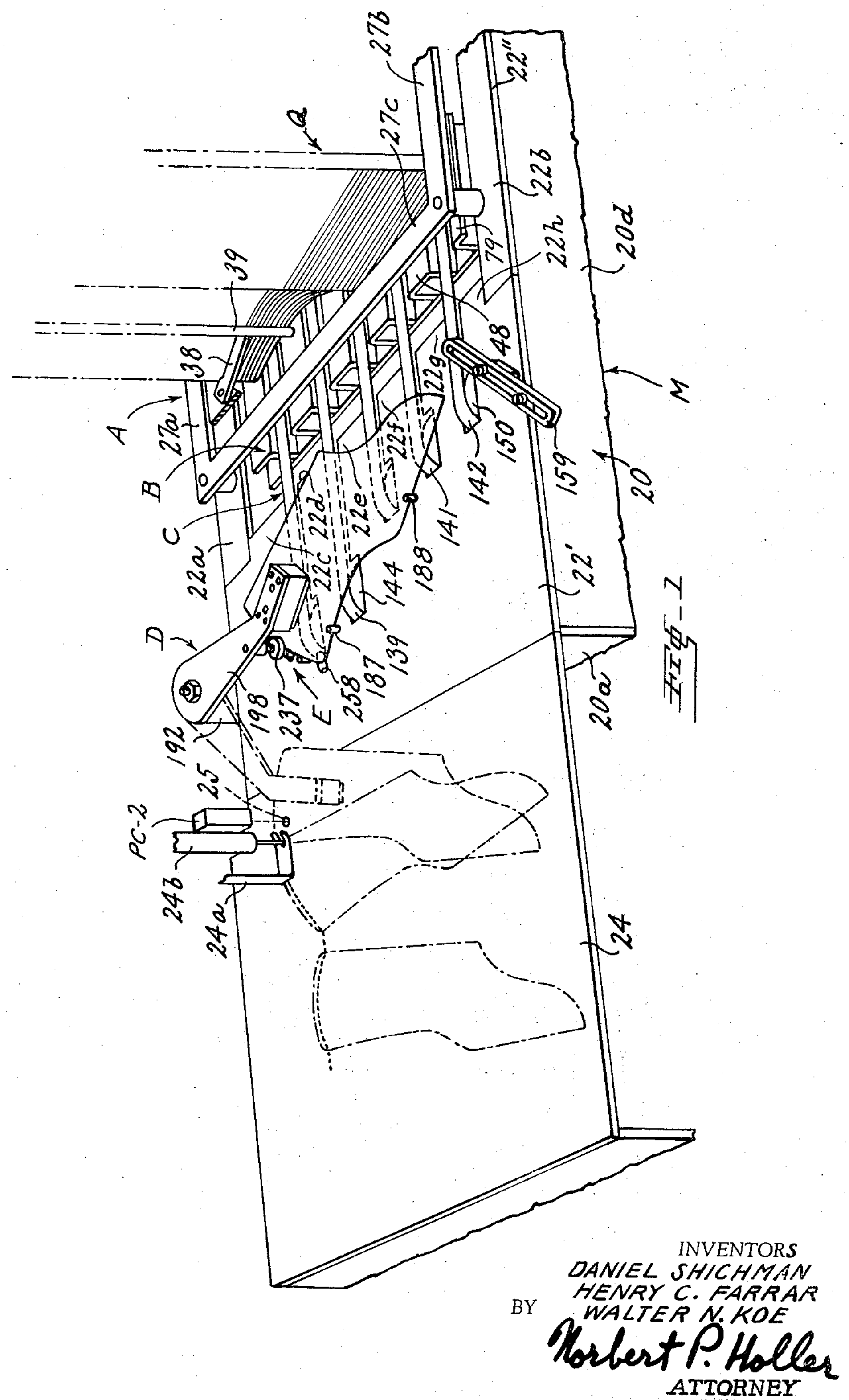

As schematically illustrated in FIG. 1, the machine M according to the present invention comprises a stack arrangement A for holding a supply of shoe upper sections or quarters Q, an arrangement B for separating pairs of shoe upper sections from the bottom of the stack, a conveyor arrangement C for moving the separated shoe upper sections from the stack to a pick-up or locating position, a transfer arrangement D for shifting the shoe upper sections from the pick-up position at the terminus of the conveyor arrangement to a seaming mechanism (which does not constitute a part of the present invention and thus will not be illustrated or described in detail herein), and a sensing arrangement E designed to detect possible errors in the separation of shoe upper sections from the stack as each pair of such sections reaches the transfer arrangement.

In the following description, reference will be made, as necessary, to at least some of the various switches, relays and other electrical control elements, all of which are shown in FIGS. 19*a* and 19*b* and some of which are also shown in one or more of the other figures. It appears advisable, therefore, briefly to refer to FIGS. 19*a* and 19*b* at the present time and explain the notations employed therein.

The circuit has incorporated therein switches designated by the legends S plus a number, control relays designated by the legends CR plus a number, latch control relays designated by the lengends LCR plus a number, limit switches designated by the legends LS plus a number, time delay relays designated by the legends D plus a number, solenoids designated by the legends SOL plus a letter, photoswitches designated by the lengs PC plus a number, and push buttons designated by the legends PB plus a number. The symbols L and U associated with the latch control relays designate the "latch" and "unlatch" coils thereof, respectively, and all of the contacts of these relays are shown in the U position. The contacts of the relays, time delays atnd photoswitches are represented by small pairs of parallel lines, such pairs of lines per se designating a normally open set of contacts, and when traversed by a diagonal line designating a normally closed set of contacts.

The vertical array of single numbers 1 to 48 at the left of FIGS. 19*a* and 19*b* identifies the respective horizontal lines of the diagram in which the various circuit elements are arranged. The vertical array of single and multiple numbers at the right of FIGS. 19*a* and 19*b* identifies the lines of the diagram in which the contacts of the various relays, time delays and photoswitches are to be found, plain numbers indicating normally open contacts, and underscored numbers indicating normally closed contacts. Merely to illustrate, in line 11 of the diagram (near the right end of the line) there is connected the coil of control relay CR–3, and to the right of this line appear the numbers 10, 12, 12 and 45. This indicates that relay CR–3 has three sets of normally open contacts (which are found in lines 10,, 12 and 45) and one set of normally closed contacts (which is found in line 12).

Reverting now to FIG. 1, the various parts of the machine M according to this invention are supported by a suitable framework 20 which comprises (see also FIGS. 2*a*, 2*b* and 3) a base plate 21 and a horizontal table top or platform 22 which are rigidly interconnected by vertical front, rear and side walls 20*a*, 20*b*, 20*c* and 20, respectively. The platform 22 is defined by a front plate 22′ and a rear plate 22″, the latter having a pair of frontwardly extending parallel side members 22*a* and 22*b* and the former having a plurality of rearwardly extending tongues 22*c* to 22*h* which are interlocked with the members 22*a* and 22*b* by a cross bar 23 bolted thereto. The purpose of the recesses defined between the tongues 22*c* to 22*h*, of which the two recesses between the tongues 22*c*, 22*d* and 22*e* are longer than the others, will be more fully explained hereinafter.

Arranged in coplanar relation with the platform 22 and abutting against the frontwardmost edge of the plate 22′ thereof is a further table top or platform 24 of a seaming mechanism which includes, among other things, a presser foot 24*a* and a sewing needle bar 24*b*, both of which can be raised and lowered by suitable drive means (not shown) as necessary. The seaming mechanism has associated therewith a photoswitch PC–2 (line 28 of the diagram) to respond to the reception and interruption of light from a source thereof located beneath an opening 25 in the platform 24. For reasons which will become clear as the description proceeds, the upper surfaces of the platforms 22 and 24 are smooth and offer substantially no frictional opposition to the sliding movement of the material of which the shoe upper sections Q are made.

With reference to the following description of details of the machine, it is to be noted that for the sake of clarity some elements are not shown in all views where they would normally appear, but each element is fully shown in at least one of the various figures.

*The stack arrangement*

Referring now as well to FIGS. 4 to 8, supported by the rear plate 22″ and rigidly secured thereto with the aid of spacers 26 is an overlying lower bearing plate 27 which in turn rigidly supports at a predetermined distance thereabove an upper bearing plate 28. The lower bearing plate 27 has a pair of frontwardly extending side arms 27*a* and 27*b* and a cross arm 27*c* defining therebetween a space 27*d* which overlies the space 22*i* defined between the side members 22*a* and 22*b* of the plate 22″. One corner region of the space 27*d* is occupied by an odd-shaped plate 29 (FIG. 4) which is welded in place for a purpose to be more fully explained presently. A vertically extending enclosure 30 having a front wall 30*a*, a rear wall 30*b* and sidewalls 30*c* and 30*d* is disposed above the openings 27*d* and 22*i* and has welded to its walls 30*a* and 30*b* a plurality of angle members 31 and 32, respectively, serving as feet by means of which the enclosure can be mounted atop the bearing plates 27 and 28 as shown. The enclosure 30 has two slotted lugs 33 and 33′ affixed to its sidewalls 30*c* and 30*d* (FIGS. 4 and 4*a*) so that the slots can be fitted over a pair of screw shanks 27*e* and 27*f* extending from the side arms 27*a* and 27*b* of the lower bearing plate and carrying a pair of knurled thumb nuts 27*g* and 27*h*. In this manner, the enclosure can be locked to, or unlocked from the plates 27 and 28 by appropriately turning the thumb nuts against or away from the lugs 33 and 33′.

The rear wall 30*b* of the enclosure 30 is somewhat shorter than the front wall 30*a*, terminating a short distance above the level of the top surface of the lower bearing plate 27, for a reason to be more fully explained presently, and is additionally cut away adjacent one side to permit an extension 28*a* of the upper bearing plate 28 located above the inwardmost portion of the plate 29 to extend into the confines of the enclosure.

At two vertically spaced locations in the front corner of the enclosure diagonally opposed to the plate 29, two horizontal triangular plates 34 and 35 are welded to the walls 30*a* and 30*c*. The plate 34 supports a fixed vertical pivot pin or bolt 36, and the plate 35 supports a rotatable vertical pivot pin 37. The pin 37 is fixed to one end of an arm 38 extending generally toward the opposite side of the enclosure, the other end of the arm being fixed, as by welding, to a vertical abutment rod 39 extending through the entire height of the enclosure (FIG. 5). Adjacent its upper end the rod 39 is similarly fixed to one end of another arm 40 the other end of which is freely rotatably journaled on the bolt or pin 36. Intermediate its ends the upper arm 40 is provided with a vertical bore which freely rotatably receives the shank of a pin or bolt 41 the head of which is affixed, as by welding, to a rod 42. The rod 42 extends frontwardly from the bolt 41 through a relatively larger opening 43 in the front wall 30a of the enclosure and on its threaded outermost end region carries a knurled thumb nut 44. The rod 42 also extends freely through a washer 45 which is located at the outer face of the wall 30a, the washer 45 being secured to the nut 44 and greater in diameter than the opening 43, and being held against the wall 30a by any suitable retaining flange structure 45' within which it has a limited degree of freedom for sliding movement.

It will be understood, therefore, that rotation of the nut 44 will move the arm 40 and therewith the rod 39 and arm 38 either rearwardly or frontwardly within the enclosure, thereby to adjust the front abutment for the stack of shoe upper sections Q as required. A rear abutment 39' (FIG. 4), which may be adjusted laterally by suitable thumb nuts 39'' and a slot in the rear wall 30b of the enclosure 30, is disposed in the same adjacent the plates 28a and 29 and terminates even with the bottom edge of said wall 30b.

*The separating arrangement*

The means for separating the shoe upper sections Q from the bottom of the stack within the enclosure 30 basically comprises, in accordance with the present invention, a pair of coplanar slicer blades 46 and 47 (FIG. 4) mounted for horizontal angular movement about respective vertical axes, and a vertically reciprocal block 48 adapted, in a manner still to be described, to be raised through the opening 22i into the confines of the opening 27d (FIG. 6) and lowered to bring its top surface below the plane of the opening 22i (FIGS. 5 and 7).

Referring now first to FIGS. 4 and 8, the blade 46, which is shown merely by way of example to be essentially crescent-shaped in outline, has its hub 46a secured to a shaft or axle 49 journaled in suitable bearings 50 and 51 supported, respectively, in the plate 29 and the overlying plate extension 28a. The shaft or axle 49 extends through the bearing 51, and above the upper plate 28–28a carries a pulley or wheel 52 which is connected by means of a drive belt 53 or the like to a relatively smaller wheel or pulley 54 secured to the downwardly depending output shaft 55 of a suitable reversible electric drive motor 56 rigidly mounted atop the plate 28.

In the space between the bearing 51 and the blade 46, the shaft 49 carries a pulley or wheel 57 which is connected by a drive belt 58 to a wheel or pulley 59 affixed to a shaft or axle 60 journaled in suitable bearings 61 in the plates 27 and 28. The pulley 59 is integral with a spur gear 63 integral with a pulley or wheel 64 supported by a shaft or axle 65 journaled in bearings 66 and 67 (FIGS. 5 to 7) mounted in the plates 27 and 28. The pulley 64 is connected by means of a drive belt 68 or the like to a pulley or wheel 69, the latter being fixed to a shaft or axle 70 which is journaled in bearings 71 and 72 in the plates 27 and 28, and which also has affixed thereto the hub 47a of the blade 47. Merely by way of example, the blade 47 is shown to be essentially sector-shaped in outline, but it will be clear that neither this shape nor that of the plade 46 is critical.

It is noted that in the illustrated embodiment of this invenion, the various pulleys and the associated drive belts are all shown as being toothed, but it will be clear to those skilled in the art that other types of drive and transmission means, e.g. sprocket wheels and chains, V-grooved pulleys and V-belts, and the like, can be similarly utilized.

As will be readily understood from the foregoing, when the motor 56 is set into operation in one direction, the blades 46 and 47 will be jointly swung into their respective protracted solid-line positions illustrated in FIG. 4 underlying the enclosure 30, while upon reverse operation of the motor, the blades will be jointly swung into their respective retracted positions illustrated in dot-dash lines in FIG. 4. The contours and sizes of the blades must, therefore, be such as to ensure that they will not interfere with each other during their angular movements.

Referring further to FIG. 4, it will be seen that the slicer blades 46 and 47 are provided at their respective leading edges, i.e. those edges which are at the front parts of the blades as the same move from their retracted positions to their protracted positions, with bevels 46b and 47b to make said edges relatively thin, thereby to facilitate their penetration into the stack of shoe upper sections Q. It will also be noted that the blades 46 and 47 are so arranged that the leading tip 46c of the blade 46 reaches the stack of shoe upper sections somewhat ahead of the tip 47c of the blade 47, for a reason to be more fully explained presently.

Figure 2A:
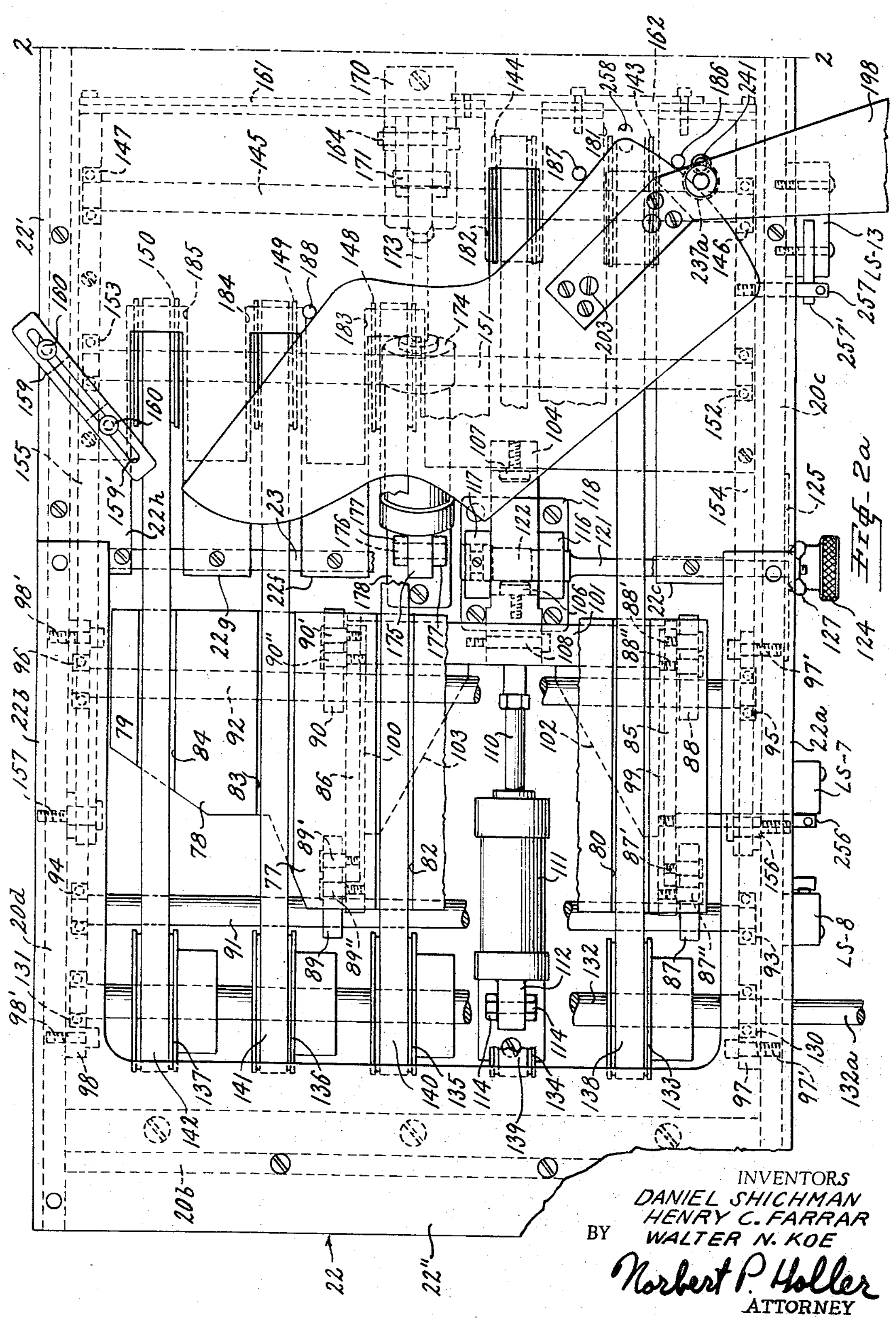
Figure 2B:
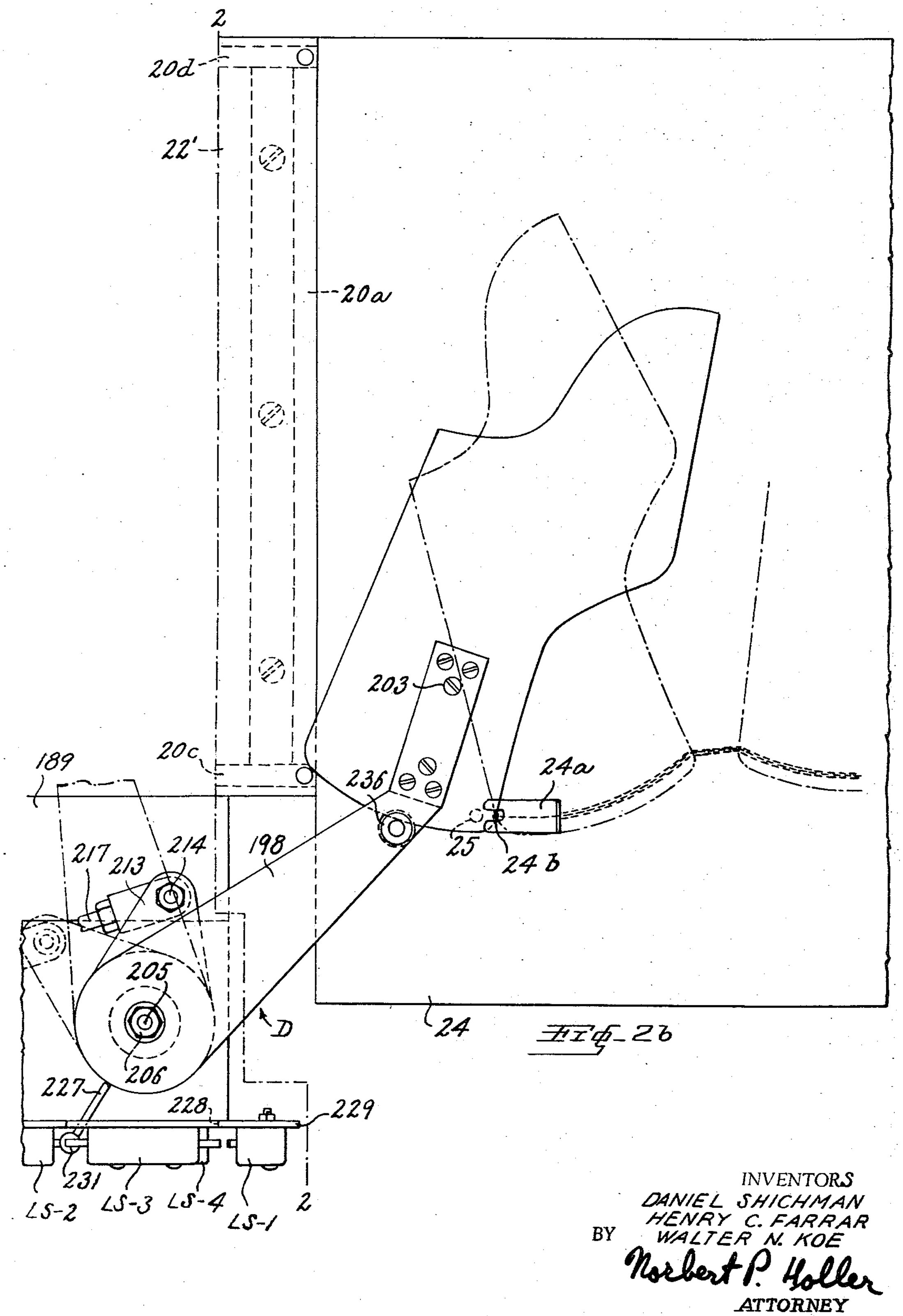

Referring now to FIGS. 2a, 3 and 9, the block 48 comprises a transverse plate 73 atop which is provided a plurality of parallel elongated bar-shaped ridges 74 to 79 of identical height defining therebetween respective grooves or recesses 80 to 84. Although the block may be otherwise constructed, in the illustrated embodiment the topside ridges are formed by welding suitable channel and angle members to the plate, as best shown in FIG. 9. The plate 73 as well as the ridge-forming elements 77, 78 and 79 are cut away as shown in FIG. 2a, so as to clear the plate 29 arranged in the associated corner of the opening 27d in the lower bearing plate 27. To the underside of the block plate 73 are affixed two parallel flanges 85 and 86 to which the upper ends of two pairs of substantially triangular or bellcrank-like rockers 87–88 and 89–90 are articulated by means of respective pivot bolts or pins 87' to 90'. The rockers 87, 89 and 88, 90 are mounted at their apices on two parallel cross-shafts 91 and 92 which are rotatably journaled in respective pairs of bearings 93–94 and 95–96 supported by a pair of vertical bearing plates 97 and 98 fixedly secured by means of screws or bolts 97' and 98' to the inner surfaces of the sidewalls 20c and 20d of the framework 20.

At their lower ends, the pairs of rockers 87–88 and 89–90 are articulated by means of respective pivot bolts or pins 87'' to 90'' to two elongated bars 99 and 100 which are joined into a U-shaped yoke by means of a cross-bar 101 and interior welded stiffening plates 102 and 103. The front end of the yoke is welded to one end of a rectangular frame 104 having an internal opening 105 therein and carrying a pair of abutment or bumper elements 106 and 107, e.g. the heads of a pair of bolts, at the inner end boundaries of the opening 105. The frame 104 at its rearwardmost end is articulated by means of a pin 108 to a yoke 109 carried by a piston rod 110 projecting from a double-acting fluid pressure cylinder 111. The cylinder at its rear end is articulated by means of a lug 112 and a pivot pin 113 to a pair of upstanding bearing members 114 rigidly secured to the base plate 21 of the framework 20 at 115.

As clearly shown in FIGS. 2a, 3 and 10, the frame 104 is disposed between a pair of spaced bearing plates 116 and 117 rigidly affixed to the base plate 21 at 118. Suitable axially aligned openings in the plates 116 and 117 rotatably receive two correspondingly spaced enlargements 119 and 120 of a shaft 121 the part 122 of which between the enlargements 119 and 120 is eccentrically offset with respect to the axis of the shaft. The enlargement 120 is provided with a circumferential groove 120' into which a screw 123 extends slidably. The other end of the shaft extends rotatably through the sidewall 20c of the machine framework and there carries a thumb nut 124 to which is fixed a semi-circular plate 125 (FIG. 11) in sliding engagement with the wall 20c. The plate 125 is provided with an arcuate slot 125' concentric with the axis of the shaft 121. Through the slot 125' slidably extends the shank of a fixed screw 126 onto the outer end of which is threaded a wing nut 127 or the like.

It will be understood from the foregoing that the eccentric part 122 of the shaft 121 constitutes a stop for the frame 104 and thus controls the operating stroke of the cylinder 111. It will further be understood that when the cylinder 111 is operated to protract the piston rod 110, the block 48 is raised to the position thereof shown in FIGS. 3 and 6, while upon reverse operation of the cylinder the block is lowered to the position thereof shown in FIGS. 5 and 7, which movement is not interfered with by the rocker shaft 92 due to the provision of arcuate recesses 128 in the block flanges 85 and 86. The arrangement in the illustrated embodiment of the invention is such that when the eccentric 122 is in its vertically down center position (FIGS. 3, 10 and 11), contact of the bolt head 106 therewith corresponds to location of the top surface of the block 48 precisely in the plane of the top surface of the lower bearing plate 27, while contact of the bolt head 107 with the eccentric 122 corresponds to location of the top block surface below the plane of the top surface of the plate 22″ (FIGS. 5 and 7). The provision of the slotted plate 125 and the interaction of the slot 125′ with the screw 126 and nut 127, of course, permits adjustment of the position of the eccentric 122 to opposite sides of its vertical down position and thereby permits the terminal positions of the frame 104 and of the block 48 to be correspondingly adjusted, for reasons which will be more fully explained hereinafter. Under these conditions, the arrangement is such that the distance between the top surface of the block 48 when in its raised position and the plane of movement of the blades 46 and 47 is precisely equal to the thickness of two of the shoe upper sections Q.

*The conveyor arrangement*

Referring further to FIGS. 2*a*, 3 and 9, the vertical bearing plates 97 and 98, the upper edges of which are centrally cut away or recessed, as shown at 129 (FIG. 3), support a pair of coaxial bearings 130 and 131 in which is journaled a shaft 132 which also has an extension **132*a* protruding through the bearing 130 and wall 20*c* for connection to a suitable drive motor 132′ (see line 10** in FIG. 19*a*). Rigidly secured to the shaft 132 at axially spaced locations thereon is a plurality of pulleys 133 to 137 about which are trained respective endless belts 138 to 142, the lower reaches of which extend frontwardly from the pulleys 133 to 137 at a level below the rocker shafts 91 and 92, and the upper reaches of which extend frontwardly from the pulleys above the block 48 and in alignment with the spaces 80 to 84, respectively, defined between the ridges 74 to 79 of the block 48.

The other ends of the belts 138 and 139 are trained about respective pulleys 143 and 144 which are mounted on a cross-shaft 145 journaled in bearings 146 and 147, while the other ends of the belts 140, 141 and 142 are trained about respective pulleys 148, 149 and 150 which are mounted on a cross-shaft 151 journaled in bearings 152 and 153. The bearings 146, 152 and 147, 153 are mounted, respectively, in a pair of elongated bearing plates 154 and 155 at spaced locations adjacent the frontwardmost ends thereof. These bearing plates are rockably mounted at their rearwardmost ends on respective pivot pins or bolts 156 and 157 supported by the sidewalls **20*c* and 20*d* of the framework 20. The lower edges of the rockable bearing plates 154 and 155 are recessed adjacent their rearwardmost ends, as indicated at 158, and as clearly shown in FIG. 3, the recessing of the stationary bearing plates 97 and 98 at 129 and the recessing of the rockable bearing plates 154 and 155 at 158** permits them to be arranged in the same plane so as not to interfere with one another.

As further clearly shown in FIG. 2*a*, the pulleys 143 and 144 are aligned with the spaces between the tongues **22*c*, 22*d* and 22*e* of the plate 22′, while the pulleys 148, 149 and 150 are located somewhat more rearwardly of the machine and are aligned with the spaces between the tongues 22*e*, 22*f*, 22*g* and 22*h* of the plate 22′. The upper reach of the belt 142 just to the rear of the pulley 150 passes under the tip of a longitudinally slotted bar 159 which is supported by the plate 22′ obliquely respect to the direction of the belt movement and can be secured in any selected adjusted position relative to the belt by means of screws 160 extending through the slot 159′**.

At their front ends, the rockable bearing plates 154 and 155 are rigidly secured to one another by a transversely extending cross-plate structure 161–162 which, midway along its length, carries a bifurcated bracket 163. Articulated to this bracket by means of a pivot bolt 164 is one end of a link 165 which at its other end is articulated by means of a pivot pin or bolt 166 to the bend of a bellcrank lever 167–168. The longer arm 167 of the bellcrank lever is rockably mounted by means of a pivot pin or bolt 169 in a suitable base structure 170 rigidly mounted on the base plate 21 of the framework 20. The free end of the shorter arm 168 of the bellcrank lever is articulated by means of a pivot pin or bolt 171 to a yoke 172 carried at the free end of a piston rod 173 extending from a double-acting fluid pressure cylinder 174. The rear end of the cylinder 174 is provided with a lug or bracket 175 articulated by means of a pivot bolt or pin 176 to a pair of upstanding bearing members 177 rigidly secured to the base plate 21 of the framework 20 at 178.

Adjacent their front ends the rockable bearing plates 154 and 155 further carry a horizontal platform 179 which is secured to the bearing plates by screws or bolts 180 and is provided with a plurality of slot-like recesses 181 to 185 (FIG. 2*a*) arranged to permit the pulleys 143, 144, 148, 149 and 150 to project upwardly therethrough. The platform 179 on its upper surface also carries a plurality of stationary pins 186, 187 and 188 which project upwardly through corresponding apertures provided in the top plate 22′ of the machine framework at predetermined locations for a purpose to be more fully described presently.

*The transfer arrangement*

Referring now in particular to FIGS. 2*a*, 2*b* and 12 to 15, it will be seen that a platform 189 is rigidly mounted adjacent one side of the table top plate 22′ of the framework 20. Rigidly secured to the platform 189 adjacent one end thereof is a mounting flange 190 of an upstanding hollow column 191 which is slidably surrounded by a cylindrical sleeve 192. The latter is provided adjacent its lowermost end with a pair of essentially rectangular openings 193 and 194 into which extend a pair of rollers 195 and 196 the axles of which are fixedly carried by the column 191. The sleeve 192 carries a cap 197 at its upper end which has an upwardly extending projection 197′.

Seated atop the cap 197 is an arm 198, provided at one end with a suitable aperture to accommodate the projection 197′ of the cap, which extends horizontally from the cap and is jointly therewith secured to the sleeve 192 by means of screws or bolts 199 (only one is shown in FIG. 13). At its free end, the arm 198 carries a rectangular socket member 200 within which is slidably received a pad 201 of a suitable rubbery or synthetic plastic material, e.g. nylon, which will not slip relative to the material of which the shoe upper sections Q are made. The pad 201 is retained in the socket member 200 by means of a plurality of shoulder screws 203 the shanks of which extend slidably through the arm and the base of the socket member. Shock absorbing springs 204 surrounding the shanks of the screws 203 are interposed between the pad and the base of the socket member.

Extending axially through the cap 197 is the reduced diameter portion of a shouldered piston rod 205 the outermost end of which is threaded and protrudes above the cap projection 197′, thereby enabling the piston rod to be locked to the cap by means of a nut 206. The other end of the piston rod 205 is connected to a piston 207 (FIG. 13) of a double-acting fluid pressure cylinder 208 fixedly mounted in and supported by the column 191 in the upper portion thereof. Fluid pressure flows into and out of the lower end of the cylinder 208 by means of a hose 209 which extends down through the column and out through a recess 210 provided therefor. Fluid pressure flows into and out of the upper end of the cylinder through a hose 211 which extends laterally from the column 191 and radially out of the surrounding sleeve 192 through a recess or opening 212 (FIG. 15) provided in the sleeve adjacent its upper end.

Intermediate its ends, the sleeve 192 is provided with a laterally projecting lug or ear 213 which fixedly supports a downwardly depending pin 214. The pin 214 slidably extends through a bushing 215 carried by a yoke or coupling 216 secured to the free end of a piston rod 217 slidably extending from one end of a double-acting fluid pressure cylinder 218 which at its other end is articulated by means of a lug 219 and a pivot bolt or pin 220 to a block or bearing structure 221 fixedly secured to the platform 189. The head **218*a* of the cylinder 218 extends between the arms 222 and 223 (FIG. 14) of a supporting block 224 rigidly secured to the platform 189, the arms 222 and 223 supporting a pair of plugs or pads 225 and 226 as shown which engage the opposite sides of the cylinder head 218*a*** so as to permit sliding movement thereof in a horizontal plane.

From the foregoing it will be understood that the sleeve 192 and therewith the arm 198 can be selectively moved angularly in a horizontal plane as well as vertically up and down, to the extent permitted by the dimensions of the openings 193 and 194 in the sleeve, by appropriate actuation of the cylinders 208 and 218.

Referring now to FIGS. 12 and 16, it will be seen that a rod 227 which is secured to the sleeve 192 extends therefrom through an opening 228 in a vertical plate 229 secured by means of screws 230 to the platform 189. The rod 227 at its outermost end carries a roller 231. Mounted on the plate 229 adjacent and about the opening 228 are four limit switches LS–1 to LS–4 (see lines 9, 27, 20 and 22 of the wiring diagram) having respective operating arms 232 to 235 positioned to be selectively engaged by the roller 231. The particular manner of actuation and functions of these switches in the control of the movements of the transfer arm 198 will be more fully explained hereinafter.

*The parts sensing arrangement*

The transfer arm 198 further carries, as best shown in FIGS. 2*a*, 13, 17 and 18, a socket 236 which supports a downwardly depending plunger 237, the latter being under the force of a spring 238 of essentially the same strength as the springs 204, and the arrangement being such that the bottom surface of the foot **237*a* of the plunger is always substantially co-planar with the bottom surface of the pad 201. The table top plate 22′ adjacent the location of the retractable pin 186 and the underlying top plate 179 of the rocker frame 154–155–161–162** (FIG. 2*a*) are provided with an opening 239 and an opening 240 (FIG. 17), respectively, through which extends a push-button member 241 secured by means of a set screw 242 to the top end of a rod 243. The rod extends slidably through a sleeve 244 fixedly mounted in the framework 20 in any suitable manner. The sleeve has an annular cap 245 fitted into its upper end, and a spring 246 is interposed between this cap and the push-button member 241 so as to bias the same to its solid-line position shown in FIG. 17, i.e. with its rounded tip disposed a predetermined distance above the top plane of the plate 22′. For a reason which will presently become clear, the axis of the rod and push-button is somewhat offset laterally with respect to the axis of the plunger 237.

Affixed to the lowermost end of the rod 243, which projects out of the bottom end of the sleeve 244, is a switch actuating foot 247 the transverse dimensions of which are sufficient to enable it to bridge the space between a pair of switch-operating plungers 248 and 249 of a respective pair of limit or microswitches LS–16 and LS–17 (see lines 18 and 19 of the wiring diagram) the housings of which are rockably connected at one end by bolts 250 and 251 to a downwardly depending frame member 252 and at the other end rest on the tips of a pair of adjustment screws 250′ and 251′ under the force of a pair of springs 253 and 254 interposed between the switch housings and a recessed fixed block 255 on the frame member 252. In this manner, the rest positions of these switches and their plungers 248 and 249 can be adjusted as required by operating conditions. Like the push-button 241, the plungers 248 and 249 are normally in their solid-line positions shown in FIG. 17.

*Miscellaneous control features*

As clearly shown in FIG. 2*a*, the leg 99 of the U-shaped yoke 99–100–101 carries a laterally extending rod 256 which projects through a suitable opening in the side-wall **20*c* of the machine framework intermediate a pair of limit switches LS–7 and LS–8 (see lines 33 and 44A of the wiring diagram) so as to operate the same in accordance with the position of the block 48. Similarly, the plate 154 of the U-shaped rocker frame 154–155–161–162 carries a laterally extending rod 257 which projects through a suitable opening in the wall 20*c* and is adapted to engage the operating arm 257′ of a limit switch LS–13 (see line 15** of the wiring diagram) when the rocker frame is moved down to retract the pins and belts (designated by the legend P & B in FIG. 19*a*) below the plate 22′. In this plate intermediate the location of the pins 186 and 187 there is further provided an opening 258 below which is arranged a photoswitch PC–1 (see line 9 of the wiring diagram) which is responsive to light from a source 259 (FIG. 19*a*). As indicated in FIGS. 19*a* and 19*b*, both of the photoswitches PC–1 and PC–2 (line 28), which may be photocells or the like, are opened, i.e. rendered non-conducting, when light directed thereon is interrupted.

*Description of operation*

The machine M according to the present invention operates as follows:

As previously indicated, the present invention eliminates the need for taking separate shoe upper sections from respective stacks and for sequentially super-imposing them in pairs, by virtue of the provision of a stacked supply of shoe upper sections or quarters Q in condition for immediate use and in the proper precise alignment required for faultless seaming of each pair of shoe upper sections. To this end, sheets of the material of which the shoe uppers are to be made are laid one on top of the other in an alternating sequence, i.e. with the bottom sheet having its face (the surface to be at the outside of the shoe) up, the next sheet having its face down, the next sheet having its face up, the next sheet having its face down, and so forth. The resultant pile is then cut with a die of suitable configuration to form the stack of shoe upper sections arranged in pairs, with each shoe upper section having the face thereof in contact with the face of the other section of the same pair.

The stack of shoe upper sections so formed is placed into the confines of the enclosure 30 and onto a support defined by the blades 46 and 47 which at this time are in their protracted positions shown in FIGS. 4 and 5. It will be understood that the stack of shoe upper sections can be lowered as a body into the enclosure 30 from above, but in order to avoid any possibility of misalignment of the stack of sections, the enclosure 30 is first removed from the bearing plates 27 and 28 by loosening the thumb nuts **27*g* and 27*h***, and then repositioned by lowering it about the stack of shoe uppers previously placed onto the blades.

The enclosure is finally re-secured to the bearing plates by again tightening the thumb nuts **27*g* and 27*h* against the lugs 33 and 33′. Care must, of course, be taken (see FIG. 4) to fit the stack of shoe uper sections into place so that the narrowed part thereof overlies that part of the block 48 which is narrowed by being cut away to accommodate the plates 28*a* and 29**. The front abutment rod 39 is adjusted rearwardly of the front wall 30*a* of the enclosure by appropriate rotation of the thumb nut 44 until it is lightly in contact with the front edge of the stack of shoe upper sections, and similarly the rear abutment 39′ may be adjusted laterally along the rear wall 30*b* of the enclosure to a position adjacent or lightly in contact with the rear edge of the stack of shoe upper sections.

In the remainder of the machine, concurrently with the foregoing, the following conditions obtain. The block 48 is in its "down" position (FIG. 5) achieved by retraction of the piston rod 110 into the cylinder 111 and corresponding displacement of the rockers 87 to 90 through the intermediary of the frame 99–100–101. The conveyor belts 138 to 142 are stationary. The piston rod 173 is fully protracted from the cylinder 174 so as to dispose the link 165 and the longer arm 167 of the bellcrank lever 167–168 in their vertical solid-line positions shown in FIG. 3, thereby to position the rocker frame 154–155–161–162 in its raised position in which the upper reaches of the frontwardmost end regions of the conveyor belts and also the pins 186, 187 and 188 project above the top surface of the plate 22′. The transfer arm 198 is in its raised position by virtue of admission of fluid pressure into the bottom of the cylinder 208 (FIG. 13) and is pulled over to its position overlying the end of the table top plate 22′, i.e. the pins and belts (FIG. 2*a*), by retraction of the piston rod 217 into the cylinder 218 (FIG. 12). The presser foot 24*a* and needle bar 24*b* of the sewing machine are down, and the push button 241 and switch-operating foot 247 carried by the rod 243 are in their "up" solid-line positions shown in FIG. 17.

Referring to FIGS. 19*a* and 19*b*, under these conditions and before power is applied, the states of the various limit switches are: LS–1 (line 9), LS–2 (line 27), LS–3 (line 20), LS–4 (line 22), LS–5 (line 38), LS–7 (line 33), LS–8 (line 44A), LS–13 (line 15) and LS–15 (line 16) are open; LS–6 (line 39) is closed; and both LS–16 (line 18) and LS–17 (line 19) are in their NC (normally closed) positions.

With respect to the switches LS–16 and LS–17, it should be noted that when the push button 241 is not depressed, the bottom face of the actuator foot 247 is just tangent to the switch-operating plunger 248 associated with the switch LS–16, this plunger then being in a position, indicated in solid lines in FIG. 17, in which the vertical distance between the level of the uppermost tip of the plunger 248 and the level of the uppermost tip of the plunger 249 associated with the switch LS–17 is substantially equal to the thickness of two, i.e., one pair, of the shoe upper sections Q. The specific functioning of these switches will be more fully explained presently.

To start the machine up, switch S–2 (at the upper left hand corner of FIG. 19*a*) is closed to apply power, e.g. 115 volts AC, to the circuit shown in FIGS. 19*a* and 19*b* through the set of normally closed contacts of control relay CR–3 in line 12. As a result, the U coil (line 16) of latch control relay LCR–1 is energized through the set of normally closed contacts of relay CR–12 in line 17. With the contacts of LCR–1 in line 23 open and push button switch PB–4 in the up position, the solenoid SOL–B is deenergized. Simultaneously, the U coil (line 20) of relay LCR–2 is energized through the normally closed set of contacts of relay CR–12 in line 21, so that the set of contacts of LCR–2 in line 18 are closed, readying the energization circuit for the coil of relay CR–2 for future action if necessary. Concurrently, the set of contacts of LCR–2 in line 25 are open, and the set of contacts of LCR–2 in line 32 are closed to ready the energization circuit for relay CR–6 for future action.

Since no shoe uppers have as yet arrived at the sewing machine, light hits the photoswitch PC–2 (line 28), whereby the latter closes and the U coil (line 28) of relay LCR–3 is energized through the closed set of contacts of relay CR–12 in line 29. The set of contacts of LCR–3 in line 19 thus are closed, readying the energization circuit for the L coil of LCR–2 for future action. The set of contacts of LCR–3 in line 30 are also closed, readying the energization circuit for the solenoid SOL–F. The set of contacts of LCR–3 in line 32 are open, however, preventing relay CR–6 from becoming energized, whereby, with the set of contacts of CR–6 in line 1 open, the sewing machine remains inactive.

With the set of contacts of LCR–3 in line 34 closed, the energization circuit for the L coil of relay LCR–4 is readied for future action. Also, relay CR–1 (line 8) is energized through the closed or conducting photoswitch PC–1 on which light is then incident in the absence of any shoe upper section overlying the opening 258. Limit switch LS–1 (line 9) is open since the arm is above the pins. It should be noted that when the arm 198 is not over the pins, LS–1 is closed so that CR–1 is then also energized. If a shoe upper reaches the pins 186 to 188 and, by obturating the opening 258, opens PC–1, CR–1 will not be immediately deenergized unless and until the arm 198 is again over the pins. Thus, since energization of CR–1 opens the set of contacts thereof in line 13, which keeps the pin-retracting solenoid SOL–E deenergized and, consequently, limit switch LS–13 (line 15) open, LS–1 only allows the arm to come down when it is over the pins. All of the foregoing happens essentially simultaneously.

As previously stated, at this time the block 48 is in its down position and the blades 46 and 47 are extended into the stack. The interlock between the sewing circuits and the separating circuits is afforded by a signal generated when the arm comes down at the pins. Since at the startup there is no shoe upper at the pins, it is necessary to simulate an "arm down" signal for the first cycle and thereafter to remove the simulated signal, until the machine is again to be placed into manual operation. The manner in which this is accomplished will become clear as the description proceeds.

To shift the machine into automatic operation, push button PB–1 (line 11) is depressed, energizing CR–3 and CR–12 through the closed push button switch PB–2, the normally closed contacts of relay CR–2, and the normally closed contacts of time delay TD–2. As CR–3 is energized, the sets of contacts thereof in line 12 reverse, i.e. the normally closed set of contacts open while the normally open set of contacts close, whereby power is removed from the "manual" circuit and applied to the "automatic" circuit. It will be noted that the said normally open contacts of CR–3 when closed complete a shunt circuit across the terminals of push button switch PB–1, thereby holding relays CR–3 and CR–12 in their energized states even when PB–1 is released. Concurrently, the set of contacts of CR–3 in line 10 close, starting the belt-driving motor 132′ to drive the belts 138 to 142 clockwise as seen in FIG. 3.

With the block 48 down, limit switch LS–8 (line 44A) is open and time delay TD–1 deenergized, so that the set of contacts of the latter in line 35 are closed and complete the energization circuits for the U coils of LCR–4, LCR–5 and LCR–6. The contacts of LCR–4 in line 36 thus are open, keeping the blade-retracting solenoid SOL–C deenergized and the blades 46 and 47 in the stack. The set of contacts of LCR–5 in line 36 are closed, however, readying the energization circuit for the solenoid SOL–C. Concurrently, the set of contacts of LCR–5 in line 40 are open, preventing the application of power to the L coil of LCR–6 despite the fact that with the blades in the stack, limit switch LS–6 (line 39) is closed. The set of contacts of LCR–6 in line 42 are also closed, readying the energization circuit for the block-raising solenoid SOL–D (line 42).

With the normally open set of contacts of CR–3 in line 45 now closed, time delay TD–4 (line 48) is energized together with time delay TD–3 (line 45). It should be noted that the delay afforded by TD–3 is greater than that afforded by TD–4. Further reference to this will be had hereinafter.

After the time interval for which TD–4 has been set, the normally open contacts thereof in line 42 close to complete the energization circuits for SOL–D and time delay TD–2 (line 43). TD–2 is the malfunction or "fail" control; thus, if the complete cycle is not repeated within the time interval for which TD–2 has been preset, the normally closed contacts of TD–2 in line 11 open, deenergizing CR–3 and CR–12 and stopping the machine.

Returning now to the solenoid SOL–D, upon energization thereof fluid pressure is admitted into the rear of the cylinder 111, whereby the resultant protraction of the piston rod 110 from the cylinder and the concurrent frontward movement of the rectangular frame 104 and the U-shaped frame 99–100–101 effects a counterclockwise angular movement of the rockers 87 to 90 from their positions illustrated in FIG. 5 so as to cause the block 48 to rise through the opening **22*i* in the table top plate 22″. As the block leaves its down position, LS–8 (line 44A) closes to energize time delay TD–1. As a result, the normally closed set of contacts thereof in line 35 open with no time delay, thereby removing power from the U coils of LCR–4, LCR–5 and LCR–6. When the block reaches its up position, in which its upper surface is precisely coplanar with the upper surface of the lower bearing plate 27, corresponding to the abutment of the bolt head 106 carried by the frame 104 against the eccentric portion 122 of the shaft 121, the limit switch LS–7 (line 33) closes, whereby relay CR–8 is energized and the normally open set of contacts thereof in line 36 closed, further readying the energization circuit for the solenoid SOL–C. After the block has reached its up positions and the time interval for which TD–3 (line 45) has been set has passed, the normally open set of contacts of TD–3 in line 46 close to energize relay CR–9 (line 47). This closes the normally open set of contacts of CR–9 in line 47A and completes a holding circuit for CR–9 through the still closed set of contacts of CR–3 in line 45. Concurrently, the normally closed set of contacts of CR–9 in line 45** open, which deenergizes TD–3.

At the end of this time interval, the normally open set of contacts of TD–3 in line 34 also close, and with the normally open set of contacts of CR–7 in line 34 still closed with the blades in the stack (since CR–7 is then energized), the L coil of LCR–4 is energized since the normally closed set of contacts of LCR–3 in line 34 is then also closed. The normally open set of contacts of LCR–4 in line 36 now close, completing the energization circuit for the solenoid SOL–C, whereby the motor 56 is actuated to retract the blades 46 and 47 from the stack. As the blades start moving back from their solid-line positions illustrated in FIG. 4, LS–6 (line 39) opens, deenergizing CR–7. The set of contacts of CR–7 in line 34 thus open while the sets of contacts of CR–7 in lines 12 and 41 close.

When the blades are fully retracted out of the stack, the entire pile of shoe upper sections Q drops down onto the block 48. At the same time, LS–5 (line 38) closes, whereby the L coil of LCR–5 is energized. This closes the normally open set of contacts of LCR–5 in line 40 and opens the normally closed set of contacts thereof in line 36, the former thus readying the energization circuit for the L coil of LCR–6, and the latter deenergizing solenoid SOL–C which permits the motor 56 to return the blades 46 and 47 to their protracted positions within the stack. As the blades leave their retracted position, LS–5 is reopened until the next cycle.

It will be noted that as the blades begin their frontward movement, the tip **46*c* of the blade 46 reaches the stack of shoe upper sections first and penetrates between two adjacent ones of the pile of shoe upper sections Q. As previously indicated, the coplanar blades 46 and 47 are mounted precisely the thickness of two shoe upper sections above the plane of the upper surface of the lower bearing plate 27, and thus the tip of the blade 46 will automatically enter the stack between two non-facing shoe upper sections so as to isolate between the bottom surfaces of the blades and the top surface of the block one of facing shoe upper sections. Only when the blade 46 has already penetrated a considerable distance into the stack of shoe upper sections does the tip 47*c* of the blade 47 reach the stack, and thus this blade will automatically enter into the slightly enlarged space previously formed by the blade 46** between the two non-facing shoe upper sections. The possibility of the two blades penetrating the stack intermediate different respective adjoining shoe upper sections is thereby effectively prevented.

When the blades are fully in their protracted positions again, as indicated in FIGS. 3 and 7, limit switch LS–6 (line 39) closes, energizing CR–7 and the L coil of LCR–6 (line 40). The normally closed sets of contacts of CR–7 in line 41 and LCR–6 in line 42 thus open, deenergizing solenoid SOL–D, whereby fluid pressure is admitted into the front of the cylinder 111, causing the block to start its down movement. This opens LS–7 (line 33), deenergizing CR–8. Simultaneously, the normally open set of contacts of CR–7 in line 34 close, readying the energization circuit for the L coil of LCR–4. The normally closed set of contacts of CR–7 in line 13 also open, but this is necessary only to enable the machine to be stopped, if necessary, by depression of the push button switch PB–2 (line 11).

As the block descends, the previously lowermost pair of shoe upper sections, as shown in phantom outline in FIG. 7, remains on the block and moves downwardly therewith while the remainder of the stack again is supported fully by the blades 46 and 47. During the descent of the block 48 to its lowermost position, shown in solid lines in FIG. 7 and corersponding to the abutment of the bolt head 107 of the frame 104 against the front side of the eccentric 122, its upper surface travels past the plane of the upper reaches of the conveyor belts 138 to 142. As soon as the block fully clears these belts, the removed pair of shoe upper sections comes to rest on the latter and is immediately moved therewith toward the front of the machine.

When the block reaches its down position, LS–8 (line 44A) opens, deenergizing time delay TD–1. After the preset time delay, the contacts of TD–1 in line 35 close, this time delay being sufficient to permit the separated pair of shoe upper sections to be moved completely clear of the enclosure 30 by the conveyor belts 138 to 142. As soon as these contacts close, of course, the U coils of LCR–4, LCR–5 and LCR–6 are again energized. This opens the set of contacts of LCR–5 in line 40 to deenergize the L coil of LCR–6, whereby the contacts of LCR–6 in line 42 close, energizing solenoid SOL–D to cause the block 48 to rise again. The set of contacts of LCR–4 in line 36 open and the contacts of LCR–5 in line 36 close. Thereafter, when the block 48 is again in the up position, LS–7 closes and the separating cycle is repeated as described, except for the action of time delay TD–3. As previously mentioned TD–3 was employed to simulate a specific signal, namely the closing of the set of contacts of relay CR–4 in line 33A, which could not occur during the start-up since LS–4 did not close in the absence of a downward movement of the arm 198 at the pins and belts, an action which could not occur as long as no shoe upper sections had reached the pins to open PC–1.

As the separated pair of shoe upper sections moves with the belts 138 to 142 (after the block 48 has dropped below the level of the opening **22*i*), a part thereof in the toe section first engages the projecting point of the bar 159, which tends to impede the movement of the pair of shoe upper sections at the belt 142. The pair of shoe upper sections thus effectively pivots around the tip of bar 159** into the solid-line position illustrated in FIG. 2*a*, so that it finally comes up against the locator pins 186 to 188 (see also FIG. 1). With the frontwardmost tip of the pair of shoe upper sections at the heel part thereof now overlying at least a part of the opening 258, the photoswitch PC–1 opens. Relay CR–1 is thus denergized (since LS–1 is also open), which causes the contacts thereof in line 13 to close. This energizes solenoid SOL–E which causes fluid pressure to be admitted into the front end of the cylinder 174, whereby the rocker frame 154–155–161–162 is drawn downwardly so as to retract both the pins 186 to 188 and the frontwardmost ends of the upper reaches of the conveyor belts 138 to 142 below the upper surface of the table top plate 22'. The pair of shoe upper sections thus remains stationary, since it is no longer contacted by the belts.

With the pins and belts down, limit switch LS–13 (line 15) closes to energize the L coil of relay LCR–1 which closes the set of contacts thereof in line 23 to energize solenoid SOL–B, whereby fluid pressure is admitted into the upper end of the cylinder 208 to bring the arm 198 down and the pad 201 into contact with the pair of shoe upper sections located thereunder. As the arm comes down, a part of the foot 237*a* of the plunger 237 also comes in contact with the upper one of the said pair of shoe upper sections while another part of the said foot engages the push button 241 and depresses it out of its solid-line position into its broken-line position shown in FIG. 17. It will be understood that the function of the springs 204 and 238 is merely to absorb any possible shocks incident to the arrival of the arm at the table top 22', so as to prevent possible damage to the arm.

Inasmuch as precisely two shoe upper sections were conveyed to the transfer arrangement, the downward movement of the plunger foot 237*a* is effective to depress the push button 241 and the rod 243 and foot 247 therewith sufficiently to operate the plunger 248 of limit switch LS–16 (line 18) so as to shift said switch from its NC position to its NO position. The plunger 249 of the switch LS–17 is not moved, however, and thus the latter remains in its NC position. Relay CR–4 was previously energized by the closing of limit switch LS–4 (line 22) when the arm 198 came down, to close the sets of contacts of CR–4 in lines 18 and 33A. The energization circuit for the L coil of relay LCR–2 is thus completed through the closed set of contacts of relay LCR–3 in line 19. The closing of the set of contacts of CR–4 in line 33A readies the energization circuit for the L coil of LCR–4 around the now open set of contacts of TD–3 in line 34. (It will be recalled that these contacts remain open continuously after their first closure as long as the machine stays in automatic operation or until the machine stops, under which condition both CR–3 (line 11) and CR–9 (line 47) remain energized and prevent a reenergization of TD–3 by keeping the set of contacts of CR–9 in line 45 open.) Relay CR–2 remains deenergized, of course, with the normally closed set of contacts of LCR–2 in line 18 now open and with LS–16 in its NO position.

The energization of the L coil of LCR–2 closes the set of contacts thereof in the line 25, energizing solenoid SOL–A, whereby fluid pressure is admitted into rear end of the cylinder 218 (FIG. 12) so as to swing the arm 198 horizontally toward the sewing machine. Thus, with the arm pressing on the shoe upper sections, and due to the smooth surface of the table top plate 22', the pair of shoe upper sections is slid without being disturbed in any other way over the table top plate 22' onto the plate 24 and up to the location of the sewing machine (FIG. 2*a*). At this time, solenoid SOL–F is energized through the closed contacts of LCR–3 in line 30, whereby the presser foot and associated adjuncts of the sewing machine are raised to permit the transfer arm 198 to position the pair of shoe upper sections properly for the start of the sewing operation. As the arm is shifted from the pins and belts, limit switch LS–4 (line 22) opens, deenergizing relay CR–4, whereby set of the contacts of CR–4 in line 18 open so that neither CR–2 nor the L coil of LCR–2 can be energized.

As soon as the arm and the shoe upper sections leave the locations of the pins and belts, both PC–1 (line 8) and LS–1 (line 9) close to energize CR–1 which opens the set of contacts of the latter in line 13 to deenergize solenoid SOL–E, whereby fluid pressure is admitted into the rear end of the cylinder 174 to raise the rocker frame 154–155–161–162 and return the pins and belts to their normal up position.

When the leading heel edge tip of the shoe upper sections reaches and covers the opening 25, photoswitch PC–2 (line 28) opens and LS–2 (line 27) closes, thereby deenergizing the U coil and energizing the L coil of LCR–3. The two sets of contacts of LCR–3 in lines 19 and 30 thus open. With solenoid SOL–F deenergized, the presser foot comes down onto the pair of shoe upper sections. Simultaneously, the contacts of LCR–3 in line 32 close, readying the energization circuit for CR–6. The set of contacts of LCR–3 in line 34 open so that the L coil of LCR–4 cannot be energized. When the presser foot comes down, limit switch LS–15 in line 16 pulses to its closed position, energizing the U coil of LCR–1, whereby the set of contacts of this relay in line 23 open to deenergize solenoid SOL–B, whereupon fluid pressure is admitted into the lower end of cylinder 208 and the arm 198 raised.

When the arm is up at the sewing machine, LS–3 (line 20) closes to energize the U coil of LCR–2, whereby the set of contacts of this relay in line 18 are closed to ready the energization circuit for CR–2. As will be more fully explained presently, this is to provide for the eventuality of an error in the separation of the next set of shoe upper sections from the stack. The set of contacts of LCR–2 in line 25 are open, deenergizing solenoid SOL–A, whereby fluid pressure is admitted into the front end of cylinder 218 to return the arm 198 while in its raised position horizontally to its position overlying the pins and belts.

Concomitantly with the just described transfer of the first separated pair of shoe upper sections to the sewing machine, of course, the separating arrangement continues in operation as previously described. It is to be noted that after the set of contacts of TD–3 in line 34 have opened, the L coil of LCR–4 can be energized only if LS–7 (line 33), the set of contacts of CR–4 in line 33A, and the sets of contacts of CR–7 and LCR–3 in line 34 are all closed. These contacts of LCR–3 close (after the start-up) whenever a "stop sewing" signal is provided by PC–1 after the trailing edge of a seamed pair of shoe upper sections has passed the opening 25, and the said contacts of CR–7 are closed when the blades 46 and 47 are in the stack. Consequently, if the block 48 comes up while the arm 198 is down, the slicer mechanism is recycled, whereas if the block is up before the arm comes down the slicer mechanism waits. The presence of the set of contacts of LCR–3 in line 34 thus ensures that the respective pairs of shoe upper sections are delivered to the sewing machine at the proper rate. It has already been mentioned that if the separating arrangement fails to recycle within the time interval for which TD–2 has been set, the set of contacts of the latter in line 11 open and deenergize CR–3 and CR–12 to stop the machine.

It should also be noted that if a pair of separated shoe upper sections arrives at the locator pins 186 to 188 before the transfer arm 198 is returned to its starting position, then since LS–1 is still closed, CR–1 remains energized despite the fact that PC–1 is opened. The closed LS–1 thus prevents CR–1 from momentarily deenergizing while the arm is still on the way back, thereby to ensure that the arm cannot come down except when it is over the pins.

With the sets of contacts of LCR–2 and LCR–3 in line 32 closed at the same time, CR–6 is energized to close the normally open contacts thereof in line 1. This energizes relay CR (line 1) and closes the sets of contacts thereof in line 2 while opening the sets of contacts in line 5. The Warner brake BR (line 6) is thus released and the clutch CL (line 3) is energized, and the sewing operation starts. Concurrently, the closing of the contracts of CR–6 in line 28 readies the energization circuit for the U coil of LCR–3. As soon as the trailing edge of the pair of shoe upper sections being seamed cleared the opening 25, light incident on PC–2 causes the same to close to energize the U coil of LCR–3. This opens the contacts of the latter in line 32 to deenergize CR–6, and the resultant opening of the contacts of CR–6 in line 28 deenergizes the U coil of LCR–3. At the same time, the contacts of CR–6 in line 1 open, deenergizing relay CR and by opening the sets of contacts thereof in line 2 and closing the sets of contacts in line 5 deenergizing the clutch and reenergizing the brake in the Warner control, thereby to stop the sewing machine. The closing of the sets of contacts of LCR–3 in lines 19, 30 and 34 readies the energization circuits for the L coil of LCR–2 and solenoid SOL–F and allows the L coil of LCR–4 (line 34) to be energized.

It should be noted that for automatic operation, sewing can take place only when LCR–2 is in the U position and LCR–3 in the L position. Thus, sewing cannot be automatically done when the circuit is in its manual operating mode since, with the sets of contacts of CR–12 in lines 21 and 29 closed, both LCR–2 and LCR–3 are then in the U position. The contacts of LCR–3 in line 19 prevent the arm from going to the sewing machine if a part is already being sewed thereat, while the contacts of LCR–3 in line 34 prevent the separating arrangement from operating for the same reason.

Referring again to the error detecting arrangement E (FIGS. 17 and 18), if for some reason or malfunction either more than two or less than two shoe upper sections have been separated from the stack by the blades 46 and 47 and conveyed to the locator pins 186 to 188, it will be desirable, of course, to stop the machine so as to avoid seaming these non-paired quarters. Accordingly, if only one such part has been conveyed to the pins, when the arm 198 comes down the bottom surface of the plunger foot 237*a* will travel a greater distance than the thickness of two shoe upper sections from the rest position of the button 241 and the latter will be depressed beyond its broken-line position. As in the case of a proper separating operation, therefore, the plunger 248 of switch LS–16 will be depressed to shift the latter into its NO position. However, the plunger 249 of the switch LS–17 will now also be depressed and will shift LS–17 into its NO position. The energization circuit for the relay CR–2 is thus completed (the contacts of CR–4 in line 18 having been closed when the arm came down), which opens the set of contacts of CR–2 in line 11 to stop the machine by virtue of the deenergization of CR–3 and CR–12. If, on the other hand, three or more shoe upper sections have been separated from the stack and fed to the locator pins, when the arm 198 comes down the plunger foot 237*a* engages the top shoe upper section and comes to a halt before it has had a chance to depress the button 241 by the thickness of two such section, whereby switch LS–16 remains in its NC position, permitting energization of CR–2 and consequent stopping of the machine.

It will be recalled that the normally closed set of contacts of relay CR–7 in line 12 are open when the blades 46 and 47 are in the stack due to the fact that LS–6 (line 39) is then closed to energize CR–7. Inasmuch as the push button switch PB–2 (line 11) is in parallel with the said contacts of CR–7, the depression of PB–2 will not stop the machine until those contacts of CR–7 open. This safety feature prevents stopping of the machine manually when the blades are out of the stack, since if this were to be done the entire stack of shoe upper sections would fall onto the block 48 when the latter is in its down position. The opening of the set of contacts of CR–2 in line 11 will also stop the machine, as previously described, e.g. in case of erroneous feed, but since at such time the blades are in the stack no harm can come to the machine. Also, time delay TD–2 (line 44) will time out and stop the machine if the combination of the sets of contacts of CR–7 in line 41 and of LCR–6 in line 42 does not open to reset TD–2 so as to prevent the opening of the contacts thereof in line 11.

It will be apparent from the foregoing that the present invention is adaptable to the feeding of other types of flat objects and articles, not necessarily sheet materials, from a stack, and that a system of the type disclosed herein finds its greatest application (although it is not restricted thereto) in the feeding of sheet material parts which are too thin and not sufficiently strong to be dispensed or separated from the bottom of the stack by conventional pushing techniques as heretofore employed. Moreover, the system is adjustable to feeding such parts singly as well as in any predetermined number in excess of one, and will operate essentially the same way. Also, the error detecting arrangement E is in effect a thickness measuring device which can be used to ensure that only sheet material parts or groups of parts of a predetermined overall thickness are fed to the working station, which need not be a sewing machine. These variations are made possible by the adjustability of the eccentric 122 through the intermediary of the slotted plate 125 (FIG. 11) which permits the block 48 to be arranged for an "up" position above or below the plane of the bearing plate 27.

Although there has been described and shown herein a preferred embodiment of the present invention, it is to be understood that the foregoing disclosure is for purposes of illustration only, and that many variations and modifications of the operational and structural features and relationships set forth can be made without departing from the spirit and scope of the present invention as defined in the hereto appended claims.

Having thus described our invention, what we claim and desire to protect by Letters Patent is:

1. Apparatus for feeding work parts from a stack of such parts to a working station, comprising first reciprocal means arranged to be protracted into and retracted from a position underlying the stack of parts, second reciprocal means disposed below the stack of parts and arranged to be protracted toward the bottom of the stack into a receiving position spaced a predetermined distance from the protracted position of said first means and retracted from the bottom of the stack into a discharging position, means operatively connected with said first and second means for controlling the same to effect a reciprocation of said first means from and back to said protracted position thereof only upon said second means being protracted into said receiving position, conveyor belt means having one section located adjacent said discharging position of said second means for receiving said parts from said second means and conveying said parts to a delivery station adjacent another section of said conveyor belt means, and third reciprocal means disposed adjacent said delivery station for transferring said parts from said other section of said conveyor belt means to the working station.

2. Apparatus for feeding work parts from a stack of such parts to a working station, comprising first reciprocal means arranged to be protracted into and retracted from a position underlying the stack of parts, second reciprocal means disposed below the stack of parts and arranged to be raised toward the bottom of the stack into a receiving position spaced a predetermined distance from the protracted position of said first means and lowered from the bottom of the stack into a discharging position, respective drive means operatively connected with said first and second means for reciprocating the same, means operatively connected with said drive means for controlling the same to effect a reciprocation of said first means from and back to said protracted position thereof only upon said second means being raised into said receiving position, means defining a delivery station, conveyor belt means having one section located adjacent said discharging position of said second means and another section adjacent said delivery station for receiving said parts from said second means and conveying said parts to said delivery station, and third reciprocal means disposed adjacent said delivery station for transferring said parts from said other section of said conveyor belt means to the working station.

3. Apparatus according to claim 2, further comprising means interconnected with said control means for synchronizing the operation of said third means with the operations of said first and second means, and means for deactivating said first, second and third means together with said conveyor belt means in response to malfunctions in the operations of said first and second means.

4. Apparatus for feeding sheet material work parts a predetermined number at a time from a stack of such parts to a working station, comprising reciprocal slicer blade means arranged to be protracted into and retracted from a position underlying the stack of parts, reciprocal block means disposed below the stack of parts and arranged to be raised toward the bottom of the stack into a receiving position spaced the thickness of said predetermined number of parts from the protracted position of said slicer blade means and lowered from the bottom of the stack into a discharging position, means for controlling the movements of said slicer blade and block means to effect a reciprocation of said slicer blade means from and back to said protracted position thereof only upon said block means being raised into said receiving position, a table top, conveyor belt means having one section located adjacent said discharging position of said block means for receiving said number of parts from said block means upon each lowering of the latter, said conveyor belt means having another section adjacent said table top, stop means juxtaposed to said table top and said other section of said conveyor belt to define a delivery station, means mounting said stop means and said other section of said conveyor belt means for reciprocal protraction into and retraction from a position above the plane of said table top, whereby upon retraction of said stop means and said other section of said conveyor belt means any parts then abutting against said stop means remain stationary on said table top, and reciprocal transfer arm means juxtaposed to said table top for to and fro movement between said delivery station and a working station and adapted to engage the parts stationary at said delivery station for sliding the same along said table top to said working station.

5. Apparatus according to claim 4, said block means comprising a block provided in its upper surface with a plurality of parallel grooves, said conveyor belt means comprising a like plurality of belts the upper reaches of which are in alignment, respectively, with said grooves in said block, said block being interposed between the upper and lower reaches of said belts at said one section thereof, and the extent of movement of said block being such that when it is raised into said receiving position, its top surface is located above said upper reaches of said belts which then are completely received in the respective grooves, while when the block is lowered into said discharging position its top surface is located below said upper reaches of said belts, whereby any of said parts initially received on said block when the latter is fully raised are taken up by said conveyor belts and conveyed away to said delivery station when the block is fully lowered.

6. Apparatus according to claim 5, said table top being provided with a plurality of slot-like recesses aligned, respectively, with said belts to permit said upper reaches of the latter at said other section thereof to move vertically through said recesses while being protracted and retracted relative to said table top.

7. Apparatus according to claim 6, said table top further being provided with a plurality of spaced apertures, said stop means comprising a like plurality of upstanding pins each aligned with a respective one of said apertures for movement therethrough while being protracted and retracted relative to said table top.

8. Apparatus according to claim 7, further comprising an abutment member adjustably disposed on said table top adjacent one side thereof and said delivery station for engagement with the leading edge of the parts being conveyed by said belts, thereby to define a pivot location for said parts to ensure proper orientation thereof for contact with said pins.

9. Apparatus according to claim 4, further comprising means for adjusting the extent of movement of said block means so as to vary correspondingly the distance between said protracted position of said blade means and the top surface of said block means upon raising of the latter into said receiving position.

10. Apparatus according to claim 4, said slicer blade means comprising a pair of coplanar blades mounted for reciprocal angular movement about respective parallel axes, each of said blades having a relatively thin leading edge as viewed in the direction of protracting movement thereof to facilitate its entry into the stack and penetration between two adjoining ones of said parts.

11. Apparatus according to claim 10, said blades being arranged so that when retracted, the leading edge of one blade is closer to said stack than the leading edge of the other blade, thereby to ensure that upon protraction said one blade enters said stack ahead of said other blade.

12. Apparatus according to claim 4, said transfer arm means comprising an elongated arm supported at one end for reciprocal angular movement about a vertical axis and for reciprocal translational movement in a vertical direction, and a contact member carried by said arm adjacent the other end thereof and therebelow for engagement at its bottom face with the top of the parts to be slid from said delivery station to said working station upon downward translation of said arm while above said delivery station.

13. Apparatus according to claim 12, further comprising a plunger carried by said arm adjacent said contact member, said plunger having a foot with a bottom face normally coplanar with the parts-engaging bottom face of said contact member and positioned for partial engagement of its bottom face with the top of the parts, a push rod extending above said table top at said delivery station for engagement at its top end with said bottom face of said plunger foot when said arm is lowered, an electrical control circuit for the apparatus, and a pair of electric switches incorporated in said control circuit and positioned to be actuated by said push rod, when the descent of said plunger foot is stopped at an elevation which is closer to or farther away from said table top than the elevation corresponding to said predetermined number of parts, for deactivating the entire apparatus.

14. Apparatus for feeding sheet material work parts a predetermined number at a time from a stack of such parts to a working station, comprising reciprocal slicer blade means arranged to be protracted into and retracted from a position underlying the stack of parts, reciprocal block means disposed below the stack of parts and arranged to be raised toward the bottom of the stack into a receiving position spaced the thickness of said predetermined number of parts from the protracted position of said slicer blade means and lowered from the bottom of the stack into a discharging position, means for controlling the movements of said slicer blade and block means to effect a reciprocation of said slicer blade means from and back to said protracted position thereof only upon said block means being raised into said receiving position, a table top, conveyor belt means having one section located adjacent said discharging position of said block means for receiving said number of parts from said block means upon each lowering of the latter, said conveyor belt means having another section adjacent said table top, stop means juxtaposed to said table top and said other section of said conveyor belt means to define a delivery station, means mounting said stop means and said other section of said conveyor belt means for reciprocal protraction into and retraction from a position above the plane of said table top, whereby upon retraction of said stop means and said other section of said conveyor belt means any parts then abutting against said stop means remain stationary on said table top, reciprocal transfer arm means juxtaposed to said table top for to and fro movement between said delivery station and a working station and adapted to engage the parts stationary at said delivery station for sliding the same along said table top to said working station, and means for sensing the number of stationary parts engaged at said delivery station by said transfer arm means and operable in response to any difference between this number and said predetermined number for stopping the entire apparatus.

15. Apparatus for feeding sheet material work parts from a stack of such parts to a working station, comprising reciprocal slicer blade means arranged to be protracted into and retracted from a position underlying the stack of parts, reciprocal block means disposed below the stack of parts and arranged to be raised toward the bottom of the stack into a receiving position spaced the thickness of a predetermined number of said parts from the protracted position of said slicer blade means and to be lowered from the bottom of the stack into a discharging position, first and second drive means operatively connected with said slicer blade means and said block means, respectively, for reciprocating the same in a predetermined sequence to effect a reciprocation of said slicer blade means from and back to said protracted position thereof only upon said block means being raised into said receiving position, a table top, conveyor belt means having one section located adjacent said discharging position of said block means and another section adjacent said table top, stop means juxtaposed to said table top and said other section of said conveyor belt means to define a delivery station, third drive means operatively connected with said conveyor belt means, the latter receiving said parts from said block means and conveying said parts to said delivery station, reciprocal frame means disposed adjacent said delivery station and suporting said other section of said conveyor belt means and said stop means for protraction into and retraction from a position above the plane of said table top, fourth drive means operatively connected with said frame means for reciprocating the same, whereby upon retraction of said frame means any parts then abutting against said stop means remain stationary on said table top, reciprocal transfer arm means positioned adjacent said delivery station for to and fro movement between said delivery station and a working station, said transfer arm means being adapted to engage said stationary parts at said delivery station and slide the same over said table top to said working station, fifth drive means operatively connected with said transfer arm means for reciprocating the same, means located adjacent said delivery station and operable upon engagement of said transfer arm means with said stationary parts for sensing whether or not the total thickness of said stationary parts is equal to said thickness of said predetermined number of parts, and control means having said sensing means incorporated therein and operatively connected with all said drive means for deactivating the same upon detection by said sensing means of a malfunction in the operation of said slicer blade and block means.

16, Apparatus for feeding sheet material work parts a predetermined number at a time from a stack of such parts to a delivery station, comprising reciprocal slicer blade means arranged to be protracted into and retracted from a position underlying the stack of parts, reciprocal block means disposed below the stack of parts and arranged to be raised toward the bottom of the stack into a receiving position spaced the thickness of said predetermined number of parts from the protracted position of said slicer blade means and lowered from the bottom of the stack into a discharging position, means for controlling the movements of said slicer blade and block means to effect a reciprocation of said slicer blade means from and back to said protracted position thereof only upon said block means being raised into said receiving position, and conveyor belt means having one section located adjacent said discharging position of said block means for receiving said parts from the latter and conveying said parts to the delivery station.

17. Apparatus according to claim 16, said block means comprising a block provided in its upper surface with a plurality of parallel channels, said conveyor belt means comprising a like plurality of belts the upper reaches of which are in alignment, respectively, with said channels in said block, said block being interposed between the upper and lower reaches of said belts at said one section thereof, and the extent of movement of said block being such that when it is raised into said receiving position, its top surface is located above said upper reaches of said belts which then are completely received in the respective channels, while when the block is lowered into said discharging position, its top surface is located below said upper reaches of said belts, whereby any of said parts initially received on said block when the latter is fully raised are taken up by said conveyor belts and conveyed away to said delivery station when the block is fully lowered.

18. Apparatus according to claim 16, further comprising means for adjusting the extent of movement of said block means so as to vary correspondingly the distance between said protracted position of said blade means and the top surface of said block means upon raising of the latter into said receiving position.

19. Apparatus according to claim 16, said slicer blade means comprising a pair of coplanar blades mounted for reciprocal angular movement about respective parallel axes, each of said blades having a relatively thin leading edge as viewed in the direction of protracting movement thereof to facilitate its entry into the stack and penetration between two adjoining ones of said parts.

20. Apparatus according to claim 19, said blades being arranged so that when retracted, the leading edge of one blade is closer to said stack than the leading edge of the other blade, thereby to ensure that upon protraction said one blade enters said stack ahead of said other blade.

21. Apparatus for separating sheet material work parts a predetermined number at a time from a stack of such parts, comprising reciprocal slicer blade means arranged to be protracted into and retracted from a position underlying the stack of parts, reciprocal block means disposed below the stack of parts and arranged to be raised toward the bottom of the stack into a receiving position spaced the thickness of said predetermined number of parts from the protracted position of said slicer blade means and lowered from the bottom of the stack into a discharging position, and means for controlling the movements of said slicer blade and block means to effect a reciprocation of said slicer blade means from the back of said protracted position thereof only upon said block means being raised into said receiving position.

22. Apparatus according to claim 21, said slicer blade means comprising a pair of coplanar blades mounted for reciprocal angular movement about respective parallel axes, each of said blades having a relatively thin leading edge as viewed in the direction of protracting movement thereof to facilitate its entry into the stack and penetration between two adjoining ones of said parts.

23. Apparatus according to claim 22, said blades being arranged so that when retracted, the leading edge of one blade is closer to said stack than the leading edge of the other blade, thereby to ensure that upon protraction said one blade enters said stack ahead of said other blade.

24. Apparatus for transferring sheet material parts from a first station to a second station, comprising a table top, conveyor belt means having the discharge end thereof juxtaposed to said table top, stop means disposed at said table top adjacent said end of said conveyor belt means and defining said first station, means mounting said stop means and said conveyor belt means for reciprocal protraction into and retraction from a position above the plane of said table top, whereby upon such retraction any parts theretofore conveyed into abutment against said stop means remain stationary on said table top as said first station, and reciprocal transfer arm means juxtaposed to said table top for to and fro movement between said first and second stations and adapted to engage the parts stationary at said first station for sliding the same along said table top to said second station.

25. Apparatus according to claim 24, said conveyor belt means comprising a plurality of belts, said table top being provided with a plurality of slot-like recesses aligned, respectively, with said belts to permit the upper reaches of the latter at said discharge end thereof to move vertically through said recesses while being protracted and retracted relative to said table top.

26. Apparatus according to claim 25, said table top further being provided with a plurality of spaced apertures, said stop means comprising a like plurality of upstanding pins each aligned with a respective one of said apertures for movement therethrough while being protracted and retracted relative to said table top.

27. Apparatus according to claim 26, further comprising an abutment member adjustably disposed on said table top adjacent one side thereof and said first station for engagement with the leading edge of the parts being conveyed by said belts, thereby to define a pivot location for said parts to ensure proper orientation thereof for contact with said pins.

28. Apparatus according to claim 24, said transfer arm means comprising an elongated arm supported at one end for reciprocal angular movement about a vertical axis and for reciprocal translation movement in a vertical direction, and a contact member carried by said arm adjacent the other end thereof and therebelow for engagement at its bottom face with the top of the parts to be slid from said first station to said second station upon downward translation of said arm while above said first station.

29. Apparatus according to claim 28, further comprising a plunger carried by said arm adjacent said contact member, said plunger having a foot with a bottom face normally coplanar with the parts-engaging bottom face of said contact member and positioned for partial engagement of its bottom face with the top of the parts, a push rod extending above said table top at said first station for engagement at its top end with said bottom face of said plunger foot when said arm is lowered, an electrical control circuit for the apparatus, and a pair of electric switches incorporated in said control circuit and positioned to be actuated by said push rod, when the descent of said plunger foot is stopped at an elevation which is closer to or farther away from said table top than the elevation corresponding to a predetermined number of said parts, for deactivating the entire apparatus.

30. Apparatus for transferring sheet material parts in small piles of predetermined numbers of parts from a first station to a second station without any disturbance of the relative alignment of the parts in each such pile, comprising a table top, a plurality of side by side conveyor belts having their discharge end juxtaposed to said table top, said table top being provided with a plurality of slot-like recesses aligned, respectively, with said belts to permit the upper reaches of the latter to move up and down relative to said table top, a plurality of stop pins located adjacent said discharge end of said belts, said table top being further provided with a plurality of apertures aligned with said pins to permit the same to move up and down relative to said table top, a frame mounting said pins and said belts for reciprocal protraction into and retraction from a position above the plane of said table top, said pins when protracted defining said first station, whereby upon such retraction any pile of parts theretofore conveyed into abutment against said pins remains stationary on said table top at said first station, and a transfer arm juxtaposed to said table top and supported at one end for to and fro movement between said first and second stations about a vertical axis and for reciprocal translational movement in a vertical direction, said arm at its other end and therebelow carrying a contact member for flat pressing engagement at its bottom face with the top of each pile of parts stationary at said first station upon lowering of said arm thereat, whereby upon a subsequent angular movement of said arm while in the lowered state thereof the engaged pile of parts is slid, without being disarranged, along said table top to said second station.

31. Apparatus according to claim 30, further comprising a plunger carried by said arm adjacent said contact member, said plunger having a foot with a bottom face normally coplanar with the parts-engaging bottom face of said contact member and positioned for partial engagement of its bottom face with the top of the parts, a push rod extending above said table top at said first station for engagement at its top end with said bottom face of said plunger foot when said arm is lowered, an electrical control circuit for the apparatus, and a pair of electric switches incorporated in said control circuit and positioned to be actuated by said push rod, when the descent of said plunger foot is stopped at an elevation which is closer to or farther away from said table top than the elevation corresponding to said predetermined number of parts, for deactivating the entire apparatus.

References Cited

UNITED STATES PATENTS

| | | | |
|---|---|---|---|
| 2,127,419 | 8/1938 | Oberender | 271—1 |
| 2,677,543 | 5/1954 | Ohrn | 271—44 |

M. HENSON WOOD, Jr., *Primary Examiner.*

R. A. SCHACHER, *Assistant Examiner.*

UNITED STATES PATENT OFFICE

CERTIFICATE OF CORRECTION

Patent No. 3,336,025 August 15, 1967

Daniel Shichman et al.

It is hereby certified that error appears in the above numbered patent requiring correction and that the said Letters Patent should read as corrected below.

Column 3, line 31, for "D" read -- TD --; line 39, for "atnd" read -- and --; line 56, for "12", second occurrence, read -- 12 --; same column 3, line 65, for "20" read -- 20d --; column 14, line 4, after "one" insert -- pair --; line 35, for "corersponding" read -- corresponding --; column 21, line 46, for "suporting" read -- supporting --; column 22, line 61, for "the back of" read -- and back to --; column 23, line 11, for "as" read -- at --; line 40, for "translation" read -- translational --

Signed and sealed this 20th day of August 1968.

(SEAL)

Attest:

Edward M. Fletcher, Jr.

Attesting Officer

EDWARD J. BRENNER

Commissioner of Patents